US006631652B1

(12) United States Patent
Okazawa et al.

(10) Patent No.: US 6,631,652 B1
(45) Date of Patent: Oct. 14, 2003

(54) MONOLEVER OPERATION APPARATUS FOR WORKING VEHICLE AND OPERATION METHOD OF THE SAME

(75) Inventors: Koji Okazawa, Hirakata (JP); Harushige Nishida, Hirakata (JP); Akifumi Inamaru, Oita (JP); Toshihiro Kawano, Oita (JP); Rikio Fuse, Omiya (JP)

(73) Assignees: Komatsu Ltd., Tokyo (JP); Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/436,496

(22) Filed: Nov. 9, 1999

(30) Foreign Application Priority Data

Nov. 11, 1998 (JP) .......................................... 10-336517

(51) Int. Cl.[7] ................................................ B60K 20/02
(52) U.S. Cl. ............................... 74/471 XY; 74/473.33
(58) Field of Search ......................... 74/471 XY, 471 R, 74/491, 523, 473.3, 473.33; 180/333

(56) References Cited

U.S. PATENT DOCUMENTS

| | | | | |
|---|---|---|---|---|
| 4,012,014 A | * | 3/1977 | Marshall | 74/471 XY |
| 4,040,499 A | * | 8/1977 | Kestian et al. | 74/471 XY |
| 4,200,166 A | | 4/1980 | Hansen | |
| 4,895,039 A | * | 1/1990 | Hegg | 74/471 XY |
| 4,895,040 A | * | 1/1990 | Soederberg | 74/491 |
| 5,379,663 A | * | 1/1995 | Hara | 74/471 XY |

FOREIGN PATENT DOCUMENTS

| | | |
|---|---|---|
| JP | 2-110719 | 4/1990 |
| JP | 2-271410 | 11/1990 |
| JP | 3-50227 | 5/1991 |
| JP | 4-18 | 1/1992 |
| JP | 4-129682 | 4/1992 |
| JP | 5-17720 | 3/1993 |
| JP | 6-33218 | 4/1994 |
| JP | 6-332218 | 4/1994 |
| JP | 9-128086 | 5/1997 |
| JP | 10-77657 | 3/1998 |
| JP | 10-252100 | 9/1998 |
| JP | 11-296246 | 10/1999 |

OTHER PUBLICATIONS

English translation and the Japanese version of "Notice of Rejection of JP Patent Application No. 10–336517"; Mailing Date: Dec. 7, 2001; Mailing No.: 575680; ("JP application No. 10–336517" is the priority of the above mentioned U.S. patent application.).

(List continued on next page.)

*Primary Examiner*—William C. Joyce
(74) *Attorney, Agent, or Firm*—Armstrong, Westerman & Hattori, LLP.

(57) ABSTRACT

A monolever operation apparatus for a working vehicle, which improves operability with excellent fine operability of a monolever. For this purpose, the monolever operation apparatus for the working vehicle includes an arm rest provided at a console placed on at least either one of the left and right sides of an operator's seat, and a monolever which is placed in front of the arm rest and is rotatively operated in a fore-and-aft direction and in a left and right direction. When operated in the left and right direction, the monolever is allowed to be operated with a distance, from a fulcrum of operation below the operator's elbow placed on the arm rest up to a grip of the monolever, remaining almost constant.

9 Claims, 17 Drawing Sheets

OTHER PUBLICATIONS

Patent Abstract of Japan; Publication No. JP 2–3733; Publication Date: Jan. 9, 1990: *Abstract* (JP 2–3733 A) was filed in the USPTO on Dec. 28, 2000 by the Supplemental IDS).

Patent Abstract of Japan; Publication No. JP 10–187263; Publication Date: Jul. 14, 1998; *Abstract* ("JP 10–187263 A" was filed in the USPTO on Dec. 28, 2000 fy bye Supplemental IDS).

Patent Abstract of Japan; Publication No. JP 1–70809; Publication Date: Mar. 16, 1990; *Abstract* ("JP 1–70809 A" is identified with "JP 64–70809 A" and "JP 64–70809 A" was filed in the USPTO on Dec. 28, 2000 by the Supplemental IDS).

English translation and the Japanese version of "Notice of Rejection to JP Patent Application No. 10–336517" (priority of the above–mentioned patent application); Mailing Date: Dec. 7, 1999, Mailing No.: 262869.

English translation and the Japanese version of "Decision on Rejection to JP Patent Application No. 10–336517"; Mailing Date: Sep. 5, 2000, Mailing No.: 251282.

English translation and the Japanese version of "Decision on Rejection to JP Patent Application No. 10–336517"; Mailing Date: Feb. 27, 1999, Mailing No.: 051331.

* cited by examiner

REAR SIDE OF VEHICLE BODY

MONOLEVER OPERATION APPARATUS FOR WORKING VEHICLE AND OPERATION METHOD OF THE SAME

TECHNICAL FIELD

The present invention relates to a monolever operation apparatus for a working vehicle such as a bulldozer, and particularly relates to a monolever operation apparatus for a working vehicle, in which forward and reverse gearshift of a transmission, and a left and right steering operation of the working vehicle are performed by operating a monolever in four of fore-and-aft, and left and right directions, and the monolever is provided with a palm rest for supporting a palm.

BACKGROUND ART

In working vehicles such as a bulldozer, a hydraulic type excavator and a mobile crane, operations are normally performed efficiently by simultaneously operating the working machine while driving a vehicle. For this purpose, an operating lever apparatus, which can easily operate a vehicle and a working machine at the same time, and which can perform the driving operations with stability against vibrations of the vehicle during traveling, have been conventionally developed, and as one measure, a monolever operation apparatus is often adopted.

FIG. 16A and FIG. 16B are views for explaining one example of typical monolever operation apparatus (for example, Japanese Utility Model Laid-open No. 6-33218) which is conventionally used in a bulldozer (hereinafter called a working vehicle), and show an explanatory plane view and a sectional side view of the monolever operation apparatus. The explanation will be made below based on FIG. 16A and FIG. 16B.

A monolever 95 is vertically provided at a rotary shaft 96 for rotating the monolever 95 in a fore-and-aft direction. The monolever 95 is rotatable in a left and right direction (the direction orthogonal to the paper surface in FIG. 16A). By the rotation in the left and right direction, each clutch and brake of each steering device (not illustrated) for controlling the left and right steering directions of the traveling equipment of a vehicle can be engaged and disengaged via a known link mechanism not illustrated. The monolever 95 is also rotatable in a fore-and-aft direction (the left and right direction of the paper surface in FIG. 16A). By the rotation in the fore-and-aft direction, forward and reverse clutches of a transmission can be engaged and disengaged via a link 97, and any one of speed gear clutches, for example, from a fist speed to a third speed, of the transmission can be engaged via a link 98.

As shown in FIG. 16A and FIG. 16B, by operating the monolever 95 from the neutral position to the forward position, a forward first speed gear (F1), a forward second speed gear (F2) and a forward third speed gear (F3) can be operated in succession. By operating the monolever 95 from the neutral position to the reverse position, a reverse first speed gear (R1), a reverse second speed gear (R2), and a reverse third speed gear (R3) are operated in succession. An operator places a portion of his or her arm below the elbow on an arm rest 90, and operates the monolever 95 in the fore-and-aft, and the left and right directions with the portion below the elbow as a fulcrum of operation P. It should be noted that an axis of rotation H0 in the left and right direction of the monolever 95 is placed horizontally in the fore-and-aft direction.

The monolever 95 as described above is operated in the left and right direction relative to a traveling direction of the working vehicle, thereby engaging the clutch with corresponding one of the left and right steering devices of the vehicle, and applying the brakes on the other one thereof to thereby enabling the vehicle to turn to the left or the right. Further, the monolever 95 is operated in the fore-and-aft direction relative to the traveling direction of the working vehicle, thereby making it possible to shifting the speed gears of the transmission.

The conventional monolever operation apparatus as described above, however, has the following disadvantages.

In the conventional monolever operation apparatus shown in FIG. 16A and FIG. 16B, the fulcrum of operation (below the elbow) P in a situation in which the elbow of the operator is placed on the arm rest 90 is at the position upper than the axis of rotation HO of the rotational operation of the monolever 95. Due to this placement, when the vehicle is turned to the left or the right, a distance between P and B, which is from the fulcrum of operation P to a left turn stroke end position B, and a distance between P and C, which is from the fulcrum of operation P to a right turn stroke end position C, change relative to a distance between P and A from the fulcrum of operation P to a center point A (hereinafter, called the neutral position A) of the grip operation in the neutral position of the monolever 95. Consequently, the operator needs to displace the fulcrum of operation P below the elbow when performing turning operations. Accordingly, the operation of the monolever 95 of the working vehicle for performing construction work lacks accuracy, thereby causing the disadvantage that a fine operation cannot be performed.

Further, since the grip of the monolever 95 is almost a cylindrical shape in a vertical direction, if the gripping force reduces during long hours of operation, the hand sometimes slips downward, therefore making it necessary for the operator to grip it once again, which causes the disadvantage of inconvenience in operation.

The turning of the hand is large at the maximum stroke position in the left and right direction of the monolever 95 which is operated with the operator's elbow being placed on the top surface of the arm rest 90, and especially at the maximum stroke position to the outer side of the operator's seat, the palm faces upward, which reduces operability, thus causing a great deal of fatigue after long hours of operation.

DISCLOSURE OF THE INVENTION

In view of the above conventional disadvantages, an object of the present invention is to provide a monolever operation apparatus for a working vehicle, which carries out the operations for traveling such as steering, and forward and reverse gearshift of a working vehicle by means of a monolever with excellent fine operability, with less fatigue being caused during long hours of operation, and with improved operability.

In order to attain the above object, a monolever operation apparatus for a working vehicle according to the present invention is a monolever operation apparatus for a working vehicle including an arm rest provided at a console placed at least any one of the left and right sides of an operator's seat, and a monolever placed in front of the arm rest and rotatively operated in a fore-and-aft direction and a left and right direction respectively, and is characterized in that when operated in the left and right direction, the monolever is allowed to be operated with a distance from a fulcrum of operation below an operator's elbow placed on the arm rest to a grip of the monolever being almost constant.

According to the above configuration, when the monolever is operated in the left and right direction, the distance from the fulcrum of operation below the operator's elbow to the grip of the monolever is almost constant, and therefore the fulcrum of operation below the elbow is not displaced even when the monolever is operated in the left and right direction. As a result, the fulcrum of operation is fixed and the arm does not swing, therefore improving operability. Further, fine operability is improved, and less fatigue is caused even after long hours of operation, thus improving workability.

Further, an axis of a first rotary shaft for rotating the monolever in the left and right direction may pass through the vicinity of the fulcrum of operation.

According to the above configuration, the axis of the rotary shaft in the left and right direction passes through the fulcrum of operation below the operator's elbow placed on the arm rest. As a result, the locus of the line connecting the fulcrum of operation and the grip becomes a cone surface with the fulcrum of operation as its vertex. Accordingly, the distance from the fulcrum of operation to the grip becomes constant, and thus the fulcrum of operation is not displaced during the operation in the left and right direction. As a result, the fulcrum of operation is fixed, and the arm does not swing, therefore improving operability. Further, fine operability is improved, and less fatigue is caused even after long hours of operation, thus improving workability.

Furthermore, a side wall, which is raised upward and formed to extend at least from a position, on which the elbow is placed, toward the front, may be provided on the outer side portion of the top surface of the arm rest.

According to the above configuration, at least the operator's elbow is fixed at the side wall, thereby making it possible to securely operate the monolever with stability even with the vibrations of the vehicle. Further, the side wall is preferably provided throughout a predetermined length from the elbow to the front portion (forearm), thereby further increasing the stability of the arm.

Further, the top surface of the arm rest may be inclined at a predetermined angle from the vicinity of the position, at which the operator's elbow is placed, toward the front.

According to the above configuration, when operating the monolever, the underside surface of the forearm in front of the operator's elbow doesn't touch the arm rest, therefore improving operability. Especially, in a fine operation, operability is improved.

Furthermore, the monolever may have a palm rest for supporting the palm formed integrally at the lower portion of the grip, and in the neutral position, the upper end of the grip may be inclined at a predetermined angle so that the inner side of the grip is positioned in front of the outer side thereof relative to the left and right direction, and is inclined toward the operator side at about 30 degrees to about 45 degrees relative to the horizontal surface.

According to the above configuration, the lower portion of the palm grasping the grip is placed on the palm rest, thereby making it suitable for the operator to only grasp the grip lightly. Accordingly, the surface pressure exerted on the hand is reduced to be low, therefore reducing the load exerted on the operator. Further, in the neutral position, the upper end of the grip is inclined at the predetermined angle (for example, about 8 degrees) so that the inner side of the grip is forward of the outer side thereof relative to the left and right direction, and is inclined at about 30 degrees to about 45 degrees toward the operator side relative to the horizontal surface, and therefore the hand grasping the grip is in a natural position. Consequently, the operator can operate the monolever in a comfortable position without undue stress, therefore reducing fatigue, and improving operability and workability.

Further, an angle made by a line of the palm and the horizontal surface when the monolever is operated to the maximum stroke outward in the left and right direction may be not more than about 90 degrees, and an angle made by a line of the palm and the horizontal surface when the monolever is operated to the maximum stroke inward in the left and right direction may be not less than about 0 degrees.

According to the above configuration, the turning of the palm to the inner side or the outer side does not become large even if the monolever is operated to the maximum stroke end to the inner side and the outer side in the left and right direction, therefore making it possible to perform the operations in a comfortable position and increase operability.

The monolever operation apparatus may further include a first rotary shaft for rotating the monolever in the left and right direction, and a second rotary shaft which is placed at a position lower than the first rotary shaft and rotates the monolever in the fore-and-aft direction, and the maximum stroke of the monolever in the fore-and-aft direction may be smaller than the maximum stroke thereof in the left and right direction.

According to the above configuration, the rotary shaft in the fore-and-aft direction is placed at a position lower than the rotary shaft in the left and right direction, therefore making the turning radius in the fore-and-aft direction larger than that in the left and right direction. In addition, the maximum stroke in the fore-and-aft direction is made smaller than that in the left and right direction, and therefore the vertical movement of the grip turning in the fore-and-aft direction reduces more compared to that of the grip turning in the left and right direction, and the grip turning in the fore-and-aft direction moves linearly. Accordingly, the operation of shifting the forward and reverse gears is facilitated. Further, as described above, the maximum stroke in the fore-and-aft direction is made smaller than that in the left and right direction, and therefore the position of the grip is not displaced from the neutral position to a large extent even if the monolever is operated in the fore-and-aft direction, which does not make a great change in the relationship between the axis of the rotary shaft in the left and right direction during the operation in the left and right direction, and the fulcrum of operation below the elbow. As a result, even if the operation in the left and right direction is performed at the maximum stroke position in the fore-and-aft direction, the locus of rotation of the grip in the left and right direction draws a circular arc of the bottom surface of the cone with the fulcrum of operation as its vertex, and therefore the fulcrum of operation is not displaced. Accordingly, the monolever can be operated with stability.

Furthermore, a recessed portion may be formed along the fore-and-aft direction on the outer side portion of the console.

According to the above configuration, with the thumb being placed on the grip, or with the thumb, index finger, middle finger or the like gripping the grip, the rest of the fingers (for example, four fingers other than the thumb, or three fingers or less) are rested in the recessed portion, thereby fixing the finger tips to facilitate to adjust the manipulated variable by the finger tips, and improving fine operability. Further, the entire forearm from the elbow to the hand can be fixed, therefore making it possible to securely perform the operations with the operator's body being stabilized even if vibrations are caused in the working vehicle.

Furthermore, the recessed portion may be formed throughout the range of the maximum stroke during a forward and reverse gear shifting operation of the monolever.

According to the above configuration, throughout the range of the maximum stroke when the monolever is operated to shift the forward and reverse gears, with the thumb, or the thumb and the other fingers being placed on the monolever, the finger tips can be fixed by placing the rest of the fingers in the recessed portion. Accordingly, in any position in which the forward and reverse gears are shifted, workability and fine operability can be improved, and the operator's body can be always stabilized during the operation of the working vehicle.

A method for operating a monolever operation apparatus for a working vehicle according to the present invention is a method for operating a monolever operation apparatus for a working vehicle in which a monolever placed in front of an arm rest provided at a console placed at any one of the left and right sides of an operator's seat is rotatively operated in a fore-and-aft direction and a left and right direction respectively, and is characterized by including the steps of:

- placing an operator's elbow on the top surface of the arm rest and pressing the operator's forearm against and along a side wall provided on the outer side of the top surface of the arm rest,
- while placing the elbow thereon and pressing the forearm against the side wall, griping a grip with the palm facing diagonally downward to the operator's seat side and with the operator's seat side of the grip of the monolever being positioned in front of the outer side of the grip, and
- performing at least one of the following:
  - on shifting forward and reverse gears, rotating the monolever in the fore-and-aft direction;
  - on steering the vehicle, rotating the monolever in the left and right direction from the inward maximum stroke position to the outward maximum stroke position with an angle made by a line of the palm and the horizontal surface ranging from about 0 degrees to about 90 degrees, and with the distance from a fulcrum of operation below the operator's elbow to the grip always remaining almost constant; and
  - on shifting speed gears of a transmission, performing a speed change operation by operating a speed gear shifting switch placed at the foremost end portion of the grip with a thumb.

According to the above configuration, since the forearm is pressed against and along the side wall provided on the outer side of the top surface of the arm rest, the forearm is stabilized against the vibrations, thereby improving operability. Since the grip is grasped with the palm facing diagonally downward to the operator's seat side, and with the operator's seat side (inner side) of the grip being in front of the outer side of the grip, the palm grasping the grip is in a natural position, thus making it possible to perform operation in a comfortable position. Further, during the steering operation of the vehicle, even if the monolever is operated from the inner side maximum stroke position to the outer side maximum stroke position in the left and right direction, the palm is turned in the range from about 0 degrees to about 90 degrees, and thus the palm is not turned to a large extent. Accordingly, the operation in the left and right direction can be easily performed. Further, since the monolever is turned in the left and right direction with the distance from the fulcrum of operation below the operator's elbow to the grip being almost constant at all times, the fulcrum of operation is never displaced, thereby stabilizing the forearm, and improving operability and workability. When the speed gear switch is provided at the foremost end portion of the grip, the speed gears can be easily shifted at the same time that the forward and reverse gearshift and steering operation are performed.

Further, when performing a fine operation while steering the vehicle, any fingers other than the thumb may be rested on a recessed portion provided along the fore-and-aft direction on the outer side portion of the console, and the grip may be gripped with at least the thumb to perform the operation.

According to the above configuration, when a fine operation is performed, any fingers other than the thumb are placed in the recessed portion provided on the outer side portion of the console along the fore-and-aft direction, and the grip is grasped at least by the thumb, or the thumb and the other fingers to carry out the operation. As a result, the finger tips are fixed, therefore making it possible to improve fine operability and reduce the swings of the operator's finger tips and body when vibrations are caused.

BRIEF DESCRIPTION OF THE DRAWINGS

FIG. 10A is the external view of the monolever operation apparatus in plan view, FIG. 10B is the view seen in the direction of the arrow 10B in FIG. 10A, and FIG. 10C is the view seen in the direction of the arrow 10C in FIG. 10A;

FIG. 14A is the three-dimensional explanatory view, and FIG. 14B is a plane explanatory view;

FIG. 16A is the sectional side view, and FIG. 16B is the plane explanatory view.

BEST MODE FOR CARRYING OUT THE INVENTION

Preferred embodiments of a monolever operation apparatus for a working vehicle according to the present invention will be explained in detail below with reference to FIG. 1 to FIG. 15.

A first embodiment will be initially explained with reference to FIG. 1 to FIG. 11.

Figure 1:
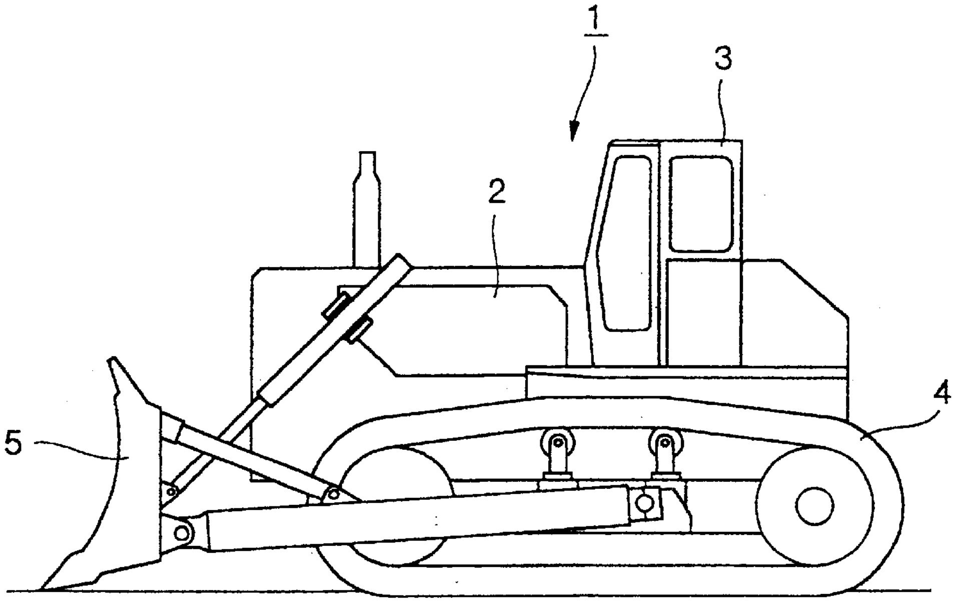
FIG. 1 is a side view of an example of a working vehicle to which a monolever operation apparatus according to the present invention is applied.

FIG. 1 shows a side view of a working vehicle to which the monolever operation apparatus according to the present invention is applied, and the explanation will be made below by taking a bulldozer 1 (hereinafter called a working vehicle 1) as an example. The working vehicle 1 has a freely traveling base carrier 4 at its lower part, is provided with a vehicle body 2 on the top of the base carrier 4, mounted with an operator's cab 3 towards the rear of the middle of the vehicle body 2, and has a vertically movable working machine (blade) 5 at the front of the vehicle body 2.

Figure 2:
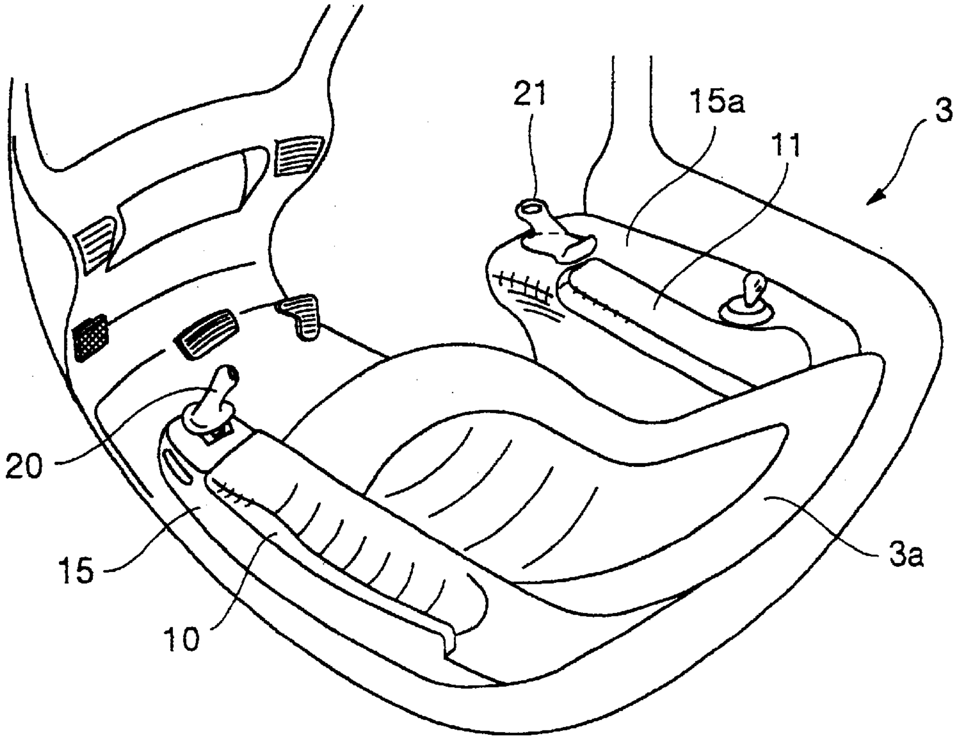
FIG. 2 is a view explaining an operator's cab of the working vehicle in FIG. 1.

FIG. 2 is a schematic diagram showing the inside of the operator's cab 3. A console 15 is placed at one of (at the left side in FIG. 2) the left and right sides of an operator's seat 3*a* placed almost in the middle of the operator's cab 3, and an arm rest 10 is fixedly provided on the portion ranging from the middle of the upper portion to the rear portion of the console 15. A monolever 20 with a palm rest for operating steering device (hereinafter, called the turning actuator) and a transmission is placed at the upper portion of the console 15 in front of the arm rest 10. A console 15*a* is placed at the other one of the left and right sides (the right side in FIG. 2) of the operator's cab 3*a*. An arm rest 11 is fixedly provided at the upper inner side of the console 15*a*, and a monolever 21 with a palm rest for operating the working machine 5 is placed in front of the arm rest 11.

Figure 3:
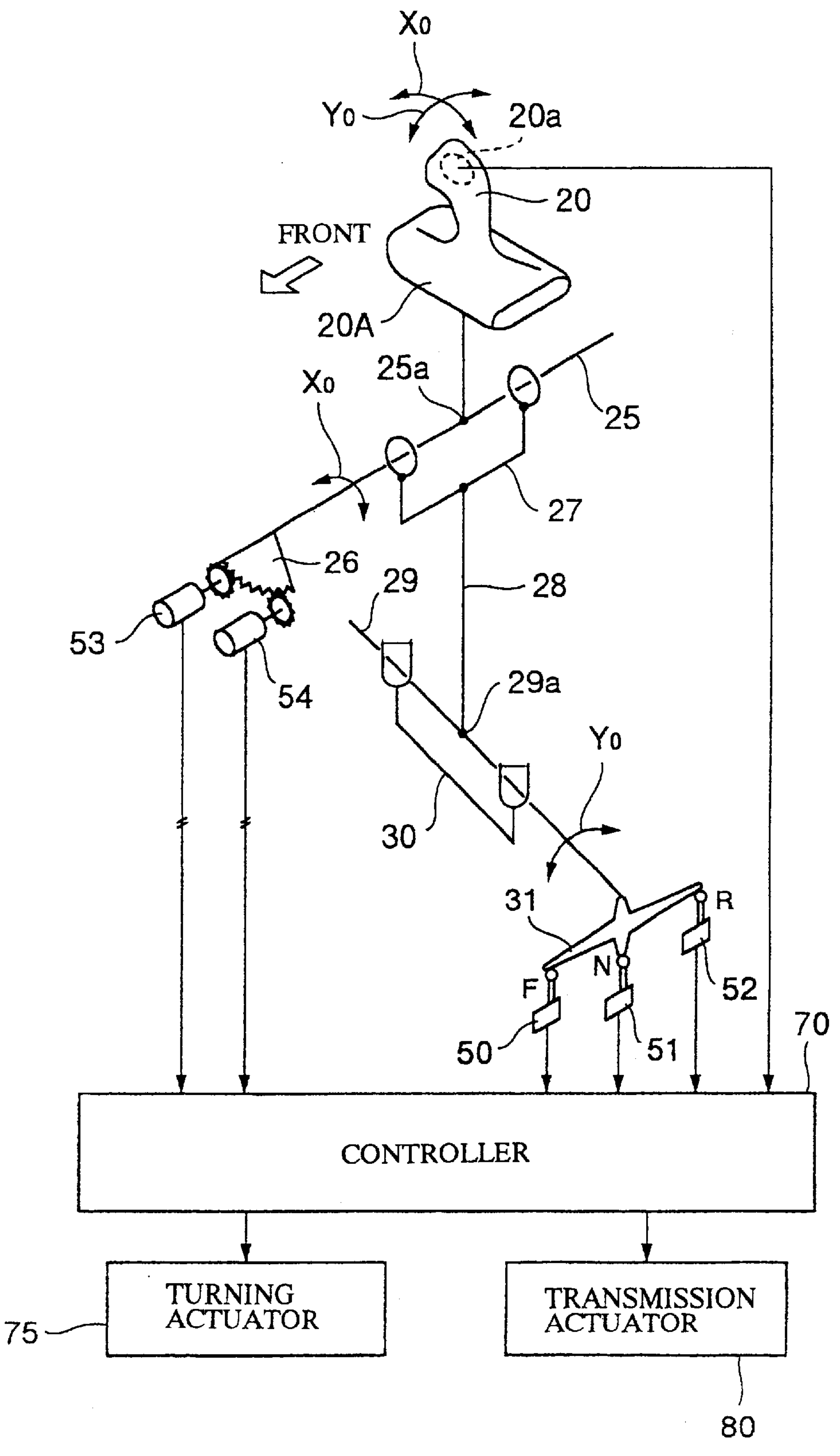
FIG. 3 is a schematic diagram explaining the entire configuration of a first embodiment of the monolever operation apparatus for the working vehicle according to the present invention.

FIG. 3 is a diagram generally explaining the entire monolever operation apparatus according to the present invention.

In the monolever 20, an operating grip portion, and a palm rest 20A on which a lower end portion of a palm of a hand gripping the operating grip portion is mounted are integrally formed. A speed gear shifting switch 20*a* for shifting up or shifting down the speed gear of the transmission is attached to the rear surface of the foremost end of the operating grip portion (the operator's seat 3*a* side). An operation signal for -shifting up or shifting down, which is outputted from the speed gear shifting switch 20*a*, is inputted to a controller 70.

The monolever 20 can be operated in a left and right X0 direction and a fore-and-aft Y0 direction, relative to a traveling direction of the working vehicle 1. The X0 direction is for a steering operation, while the Y0 direction is for a forward and reverse gearshift operation. The monolever 20 is coupled to a first rotary shaft 25, which is supported by a first bearing member 27, and a rotary gear 26 is fixed to one end portion of the first rotary shaft 25. The monolever 20 is turned around the first rotary shaft 25 in the X0 direction, and thereby the rotary gear 26 turns at the same angle as the turning angle of the first rotary shaft 25 in the X0 direction.

Two potentiometers 53 and 54 for detecting the turning angle in the X0 direction, namely, a steering manipulated variable, are coupled to the rotary gear 26 via gears attached to respective input shafts. In FIG. 3, the two potentiometers 53 and 54 each detects a left steering manipulated variable or a right steering manipulated variable of the monolever 20, both of them detecting a turning angle in the X0 direction at the same time, and therefore it is sufficient to provide at least any one of them. The reason for providing the two potentiometers 53 and 54 in the first embodiment is to improve reliability. Specifically, when any one of the potentiometers is out of order, the other one covers the detection function of the aforesaid potentiometer out of order. The turning angle signals from the potentiometers 53 and 54 are inputted to the controller 70.

Further, the first bearing member 27 shown in FIG. 3 is coupled to a second rotary shaft 29 via a coupling member 28. The second rotary shaft 29, which is supported by a second bearing member 30, turns in the Y0 direction around the second rotary shaft 29 by turning the monolever 20 in the fore-and-aft Y0 direction relative to the traveling direction of the working vehicle. A rocking arm 31 which freely rocks in the fore-and-aft direction is coupled to one end portion of the second rotary shaft 29. By rocking the monolever 20 in the fore-and-aft Y0 direction, the rocking arm 31 actuates a micro-switch 50 (hereinafter called the detection switch 50) for recognizing a forward movement in a forward gear position (F), and actuates a micro-switch 52 (hereinafter called the detection switch 52) for recognizing a reverse movement in a reverse gear position (R). The rocking arm 31 actuates a micro-switch 51 (hereinafter called the detection switch 51) for recognizing neutral state in a neutral position (N). Each signal from these detection switches 50, 51, and 52 are inputted to the controller 70.

The controller 70 has a computing unit consisting of a computer equipment such as a microcomputer, and includes a signal input element, a computing element, and a command signal output element which are not illustrated. The controller 70 receives a left steering manipulated variable signal and a right steering manipulated variable signal from the potentiometers 53 and 54 and performs computation, and outputs a left steering command signal and a right steering command signal to a turning actuator 75 corresponding to a steering manipulated variable signal of each direction. The turning actuator 75 controls the engagement and disengagement of each of left and right steering clutches (not illustrated) and the braking force of a brake according to the left steering command signal and right steering command signal, thereby steering the working vehicle to the left or the right. As described above, the monolever 20 is operated in the X0 direction, thereby controlling the clutches and the brake of the turning actuator 75.

The controller 70 receives a shift-up signal or a shift-down signal from the speed gear shifting switch 20*a* and a forward and reverse gear shifting signal from any one of the detection switches 50, 51, and 52, and performs a computation. Based on the result of the computation, the controller 70 outputs a command signal to a transmission actuator 80 consisting of a forward clutch, a speed gear clutch, and the like of the transmission. For example, when the speed gear shifting switch 20*a* is operated to shift down to a first speed gear and the monolever 20 is operated forward in the Y0 direction, the gear is shifted to the forward first speed gear, and when the monolever 20 is operated rearward in the Y0 direction, the gear is shifted to the reverse first speed gear. On shifting up in this situation, when the speed gear shifting switch 20*a* is operated to shift up to the second speed gear or the third speed gear and the monolever 20 is operated forward in the Y0 direction, the gear is shifted to the forward second speed gear or the forward third speed gear, and when the monolever 20 is operated rearward in the Y0 direction, the gear is shifted to the reverse second speed gear or the reverse third speed gear.

The speed gear shifting switch 20*a* includes a shift up switch and shift down switch having seesaw type operating buttons, and each switch is clicked (one push for each switch), thereby facilitating the shift up operation or the shift down operation of the transmission.

Figure 4:
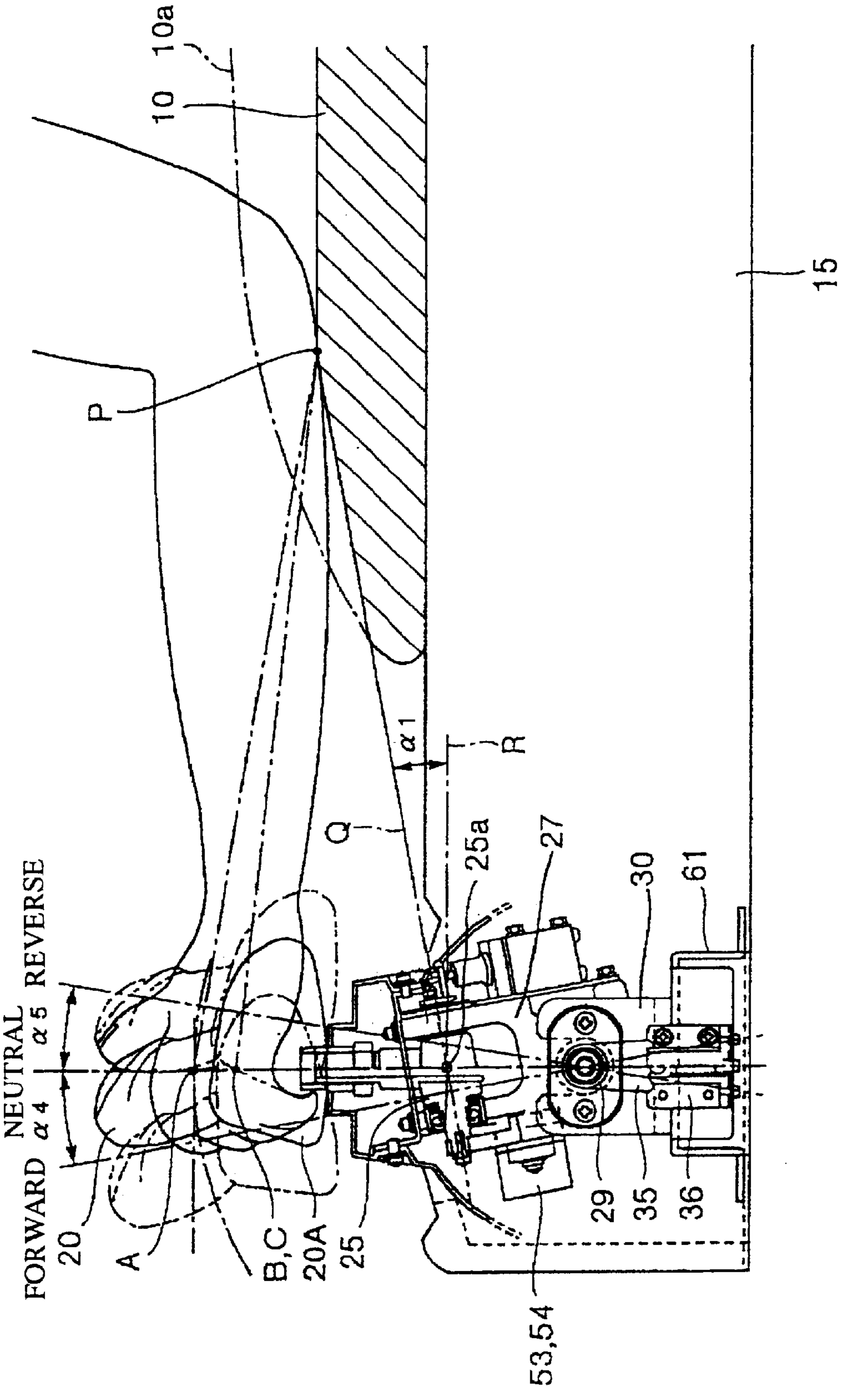
FIG. 4 is a side view of the monolever operation apparatus according to the first embodiment.

FIG. 4 is a view explaining the essential part of the monolever operation apparatus according to the present invention. A link mechanism of the monolever operation apparatus will be described in detail later with FIG. 11, and the general explanation will now be made.

In FIG. 4, a base 61 of the monolever operation apparatus is attached to the front portion of the console 15. The second bearing member 30 is attached on the top of the base 61, and the second rotary shaft 29 is supported at the left and right side end portions of the second bearing member 30 to be rotatable in the fore-and-aft direction. A detent 35 is attached on a surface of any one of the left and right ends of the second rotary shaft 29 to make it easy for the operator to find the forward position, neutral position and rear position at the time of the gearshift between forward and reverse gears. A detent receiving member 36 for the detent 35 is attached to the side portion of the base 61. Further, the second rotary shaft 29 is coupled to the first bearing member 27, which supports the first rotary shaft 25 to freely rock in the left and right direction, and the first rotary shaft 25 is coupled to the bottom of the monolever 20. The potentiometers 53 and 54 are attached to the front of the first bearing member 27, and gears attached to the potentiometers 53 and 54 are engaged with gears attached to the first rotary shaft 25, thus detecting the left and right rocking angles of the monolever 20 by means of the potentiometers 53 and 54. The palm rest 20A is integrally formed at the lower portion of the monolever 20.

The arm rest 10 is provided on the top surface of the console 15 and a side wall 10*a* raised upward is provided on the outer side of the top surface of the arm rest 10. The operator places his or her elbow on the arm rest 10, presses his or her forearm from the elbow along and against the side wall 10*a*, and grips the grip of the monolever 20 by hand. The tilt angle of the first rotary shaft 25 relative to the horizontal surface is set so that the axis of the first rotary shaft 25 passes almost through a fulcrum of operation P (the position below the elbow) of the operator's hand when the operator grips the grip of the monolever 20 which is in the neutral position of the forward and reverse gearshift. Specifically, a tilt angle α1, which is formed by the axis of the first rotary shaft 25 and a horizontal line R horizontally extending from the fulcrum of rotation 25*a* in the fore-and-aft direction, is set so that a line connecting the fulcrum of rotation 25*a* of the first rotary shaft 25 of the monolever 20 and the fulcrum of operation P almost matches an axis Q of the first rotary shaft 25 when the operator having a standard arm length (the length from the operation fulcrum P to the center of the palm) grips the monolever 20 in the neutral position of the forward and reverse gearshift. Incidentally, the inventors confirm that the setting of the tilt angle α1 at about 10 degrees results in excellent operability, by an experiment.

In the monolever 20, the manipulated variable from the neutral position to the forward position is set at a predetermined angle of operation α4, and the manipulated variable from the neutral position to the reverse position is set at a predetermined angle of operation α5, in the forward and reverse gearshift operation. The predetermined angles of operation α4 and α5 are set so that the maximum stroke during the forward and reverse gear shifting operation is smaller than the maximum stroke during the left and right steering operation.

Further, as shown in FIG. 4, the top surface of the arm rest 10 in front of the vicinity of the fulcrum of operation P is inclined downward toward the front almost corresponding to the aforesaid predetermined tilt angle α1. Further, the height from the base 61 to the grip of the monolever 20 is set so that the arm is almost horizontal while gripping the monolever 20.

As a result, when the operator operates the monolever in the left and right direction to perform a steering operation, the center of rotation of the monolever 20 (specifically, the first rotary shaft 25)passes through the fulcrum of operation P. Consequently, the locus of the line connecting the fulcrum of operation P and the center position (corresponding to the positions A, B and C in FIG. 4) of the palm on the grip of the monolever 20 draws a form almost equal to a conical shape with the first rotary shaft 25 as its axis. This means that the distance between the fulcrum of operation P and the center position of the palm on the grip of the monolever 20 hardly changes even if the monolever 20 is operated. Specifically, the operator can perform the operation in the left and right direction without moving the position of the fulcrum of operation P. Further, the operation can be performed with the arm remaining almost horizontal, therefore facilitating the operation.

Next, the main link mechanism and the like of the monolever operation apparatus according to the present invention will be explained based on FIG. 5 to FIG. 11 with reference to FIG. 3.

Figure 5:
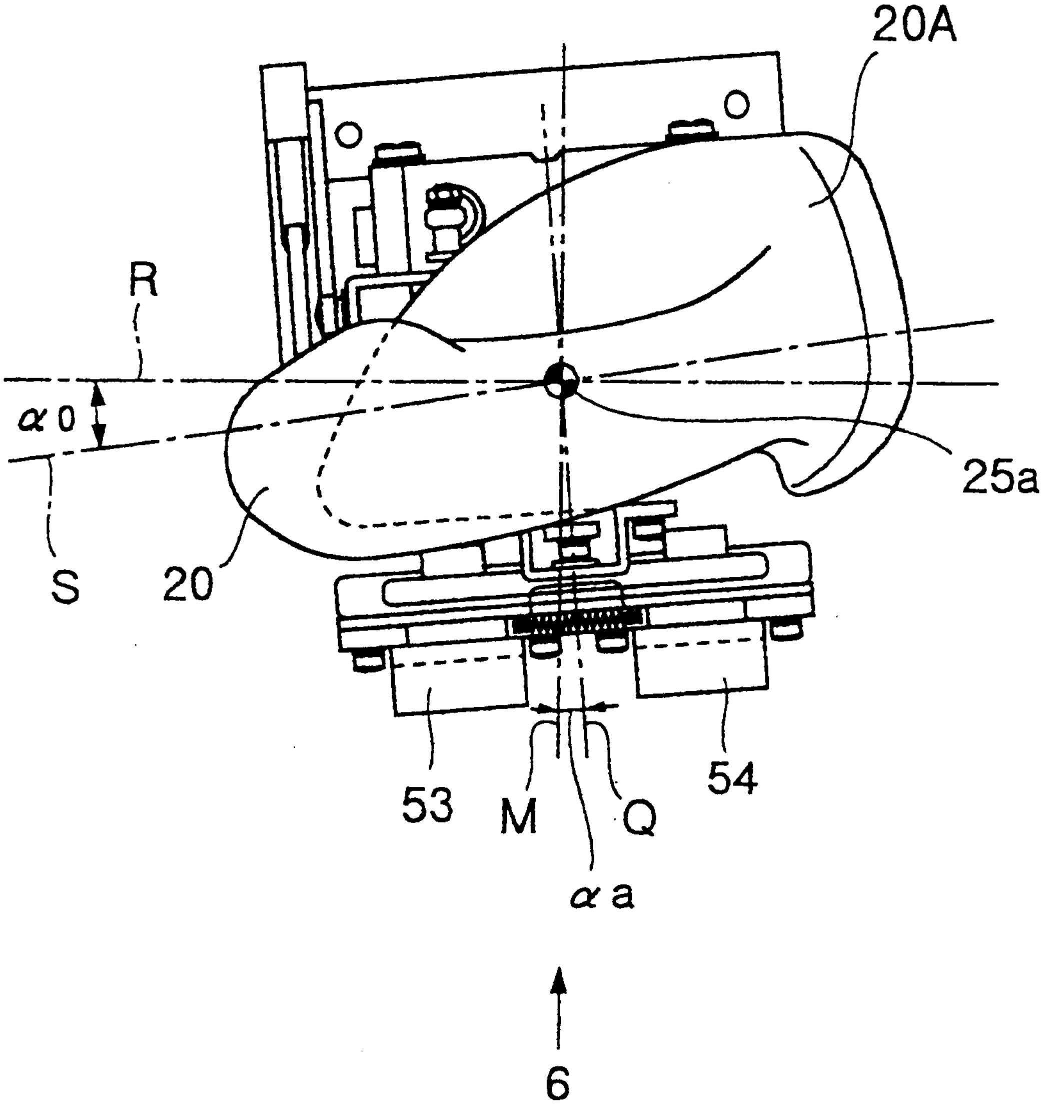
FIG. 5 is a plane view of the monolever operation apparatus according to the first embodiment.

FIG. 5 is a plane view of the monolever operation apparatus. The palm rest 20A for supporting the lower portion of a palm is integrally formed at the lower portion of the monolever 20. Further, the monolever 20 is coupled to the aforesaid first rotary shaft 25 at the position of the fulcrum of rotation 25*a*. In FIG. 5, a center line S passes through the fulcrum of rotation 25*a*, and the center in the longitudinal direction of the grip of the monolever 20. The center line S passes through the fulcrum of rotation 25*a* and is inclined at a predetermined angle α0 relative to the horizontal line R horizontal in the left and right direction so that the operator side surface of the monolever 20 faces the operator's seat, specifically, the operator's seat side of the grip is positioned forward relative to the outer side of the grip.

Further, the axis Q of the first rotary shaft 25 forms a predetermined angle α a relative to a line M which passes through the fulcrum of rotation 25*a* and extends in the fore-and-aft direction of the vehicle.

As described above, since the grip of the monolever 20 is inclined at the predetermined angle αO relative to the left and right direction, the palm gripping the grip faces the operator's seat, which is the natural position of the palm. Further, the rotary shaft in the left and right direction is provided so as to be inclined at the predetermined angle α a relative to the fore-and-aft direction, thereby making it possible to comfortably operate the monolever 20 in the left and right direction while gripping the grip with the palm in a natural position as described above. Incidentally, the inventors confirm that operating comfort can be obtained when the predetermined angle αO is about 8 degrees, and the predetermined angle α a is about 4 degrees by experiment.

Figure 6:
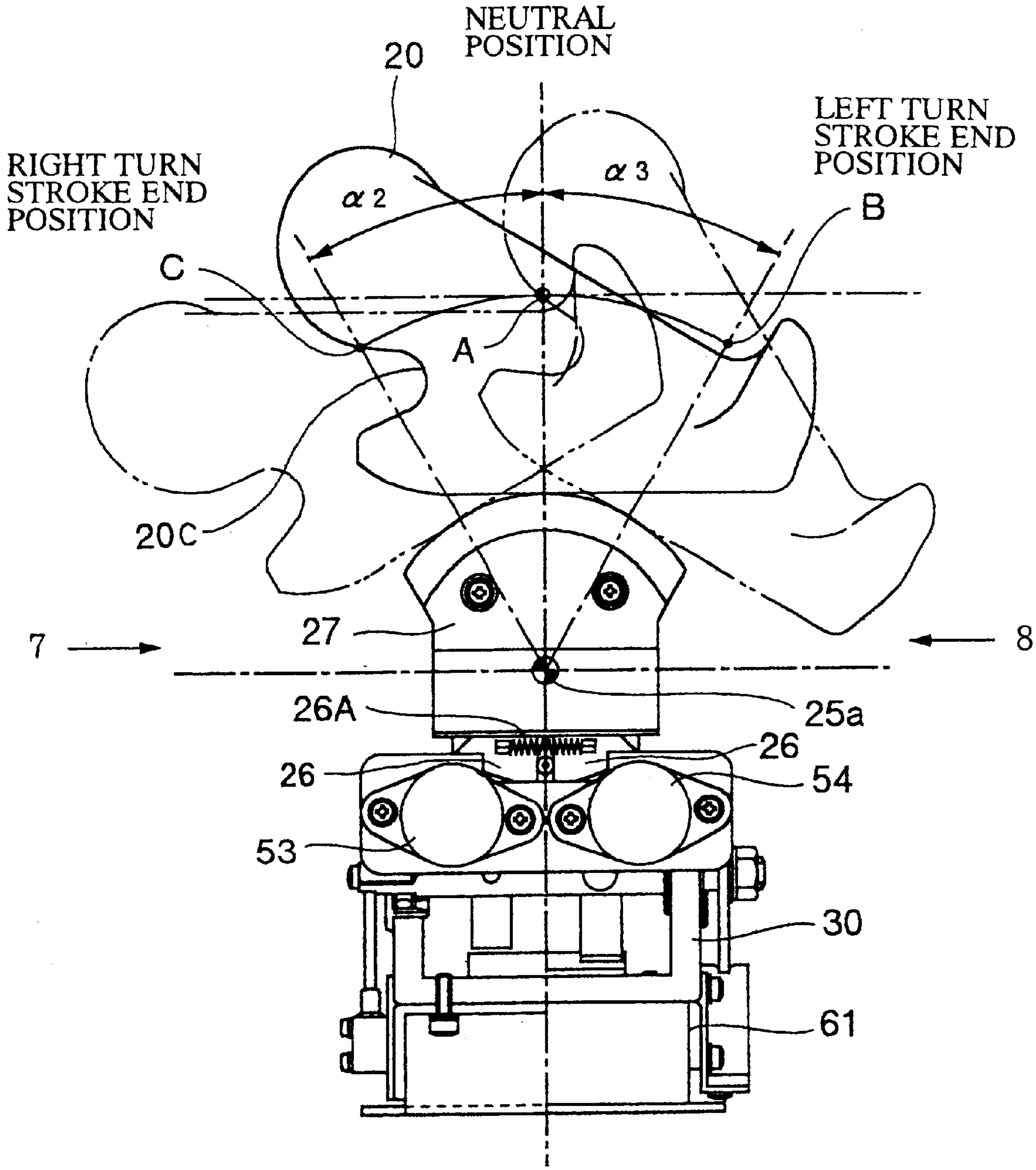
FIG. 6 is a view seen in the direction of the arrow 6 in FIG. 5.

FIG. 6 is a view seen from the front of the operator's seat in FIG. 5. In FIG. 6, the monolever 20 is operable in the left and right direction around the fulcrum of rotation 25*a* of the first rotary shaft 25 shown in FIG. 3. The upper end of the grip in the neutral position of the monolever 20 is inclined at a predetermined angle (for example, about 30 degrees to about 45 degrees) toward the operator side relative to the horizontal surface. The maximum angle of operation from the neutral position of the monolever 20 to a right turn stroke end position C is set at a predetermined angle α2. The maximum angle of operation from the neutral position to the left turn stroke end position B is set at a predetermined angle α3. The predetermined angles α2 and α3 are set so that the angle of the palm relative to the horizontal surface ranges from about 0 degrees to about 90 degrees when the operation is performed in the range from the maximum stroke end position C in the left and right direction to the inner side to the maximum stroke end position B to the outer side. Further, a recessed portion 20C on which a thumb is placed is formed at the grip portion of the monolever 20. Incidentally, as a result of the experiment made by the inventors, excellent results are obtained by setting the predetermined angles α2 and α3 at about 30 degrees.

As a result, the orientation of the palm gripping the monolever 20 is in a natural position, therefore enabling the operator to perform operation comfortably. In addition, it is designed so that the palm does not face a reverse direction relative to the horizontal surface and does not face upwards relative to the vertical state even if the operator operates the monolever 20 in the left and the right direction up to the maximum stroke end positions B and C, and as a result the palm does not make a large turn, thus providing excellent operability of the monolever 20. Further, the recessed portion 20C on which a thumb is placed is formed at the grip portion of the monolever 20, thus making it possible to operate the monolever 20 with stability even if the working vehicle causes vibrations.

A tension spring 26A is attached between two rotary gears 26 and 26 (the details will be described later based on FIG. 11) which are attached to the front end of the first rotary shaft 25. It should be noted that the components given the numerals and symbols other than the above are explained in FIG. 4 with the same numerals and symbols being given thereto and the explanation will be omitted here.

Figure 7:
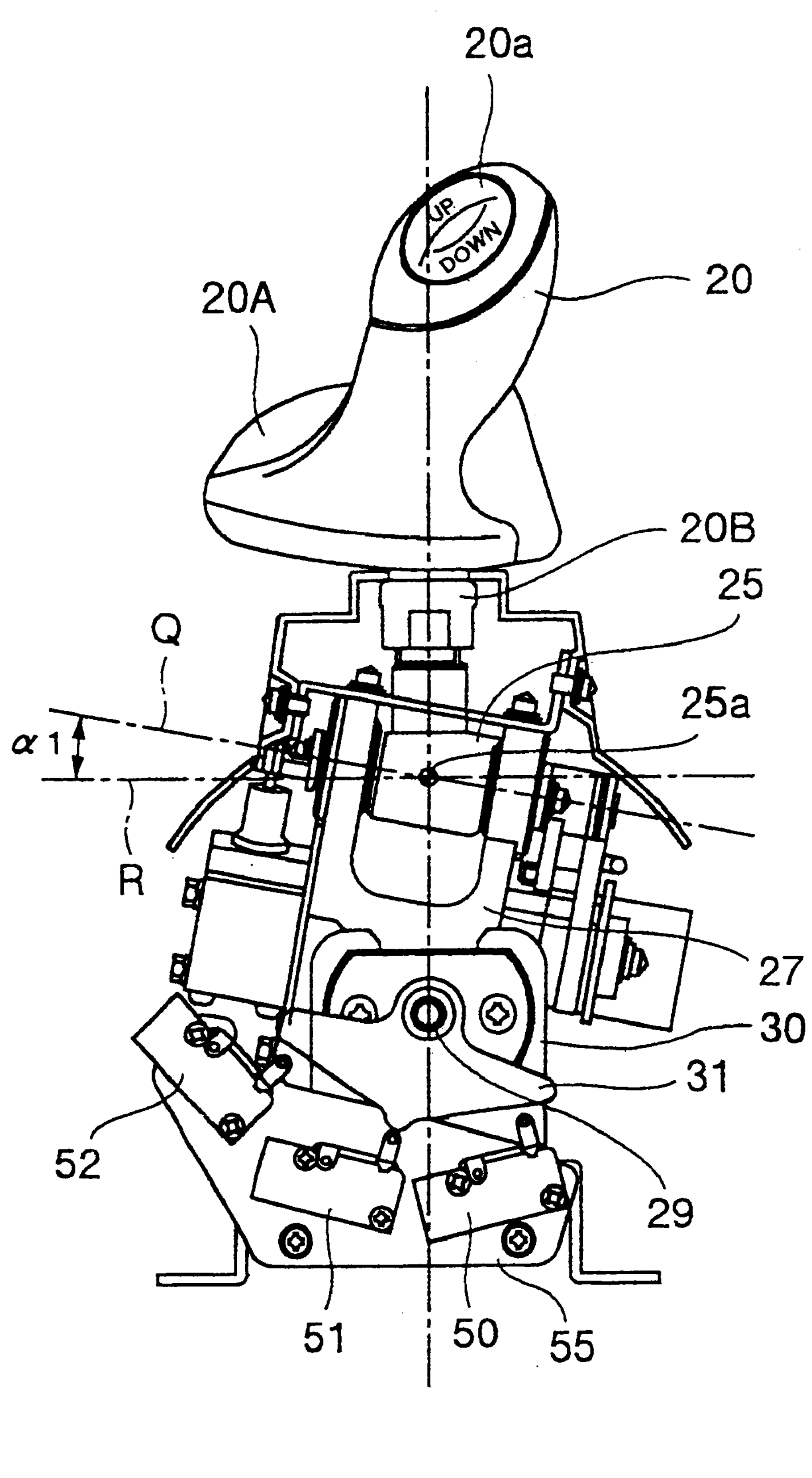
FIG. 7 is a view seen in the direction of the arrow 7 in FIG. 6.

FIG. 7 is a side view seen from the operator's side in FIG. 6. In FIG. 7, the speed gear shifting switch 20*a* for shifting gears to a higher gear or a lower gear of the transmission is placed at the foremost end of the grip portion of the monolever 20. The speed gear shifting switch 20*a* consists of a seesaw type changeover switch, includes a raised portion having a predetermined height at the center of the operating button, and has a shift up and shift down operation element respectively at the positions upper and lower than the raised portion. A shift up switch and a shift down switch not illustrated, which are actuated by turning on/off each operation element, are incorporated in the monolever 20. A signal from each switch is inputted to the controller 70 via a cable not illustrated.

Further, the monolever 20 is coupled to the first rotary shaft 25 via a coupling member 20B. The axis Q of the first rotary shaft 25 when the monolever 20 is in the neutral position and the horizontal line R extending horizontally in the fore-and-aft direction from the fulcrum of rotation 25*a* make the predetermined tilt angle α1 as described above.

The rocking arm 31 is attached to the end surface of the second rotary shaft 29 (the right end surface in this case) which is supported by the second bearing member 30. The detection switches 50, 51, and 52 are attached to the side surface of the base 61 via a mounting plate 55. The monolever 20 is operated forward relative to the traveling direction of the working vehicle, and thereby the rocking arm 31 actuates the detection switch 50 for a forward transmission gear. The monolever 20 is operated rearward, and thereby the rocking arm 31 actuates the detection switch 52 for a reverse gear. When the monolever 20 is returned to the neutral position, the detection switch 51 for the neutral position is actuated. Signals from these detection switches 50, 51 and 52 are inputted into the controller 70 shown in FIG. 3.

Figure 8:
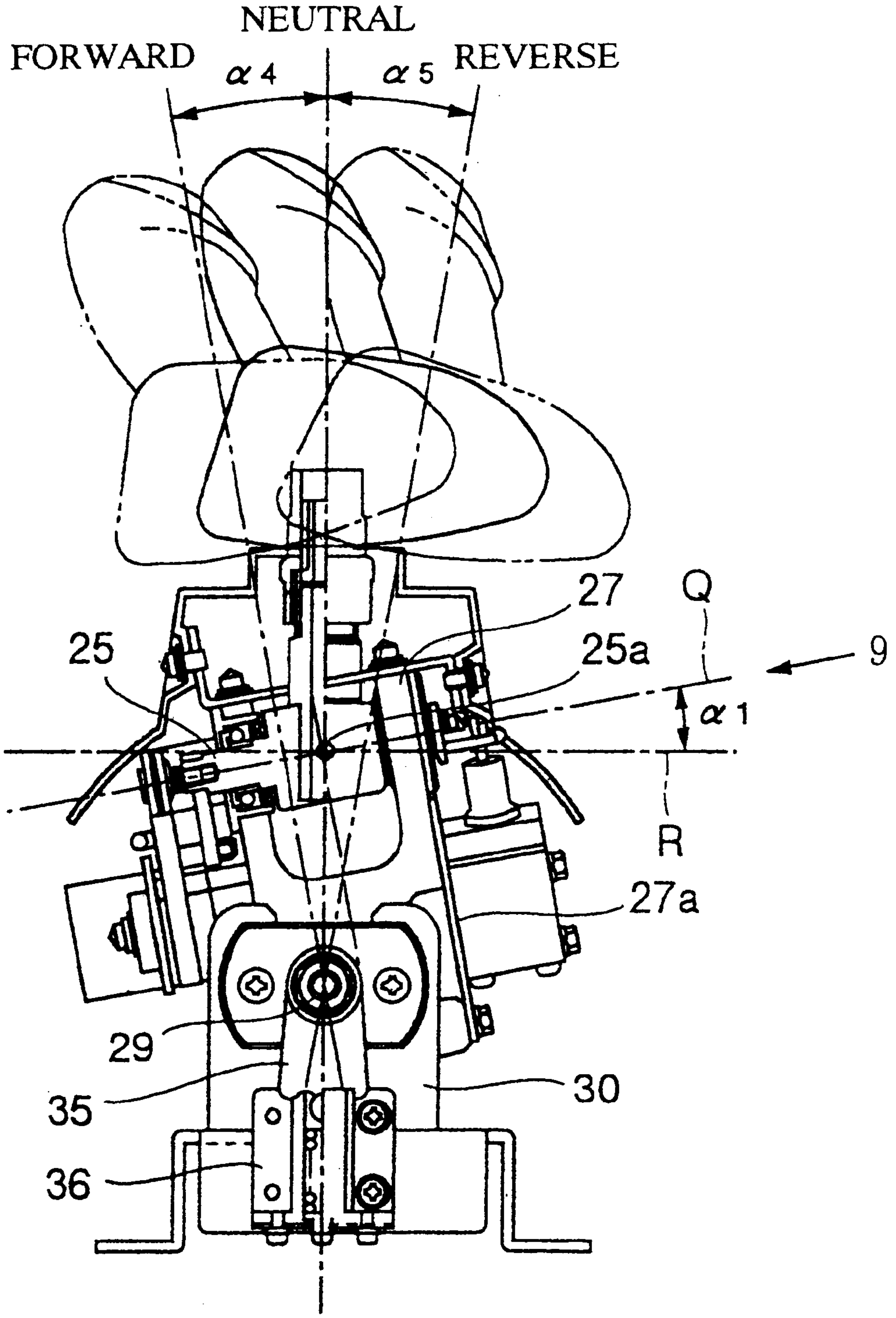
FIG. 8 is a view seen in the direction of the arrow 8 in FIG. 6.
Figure 9:
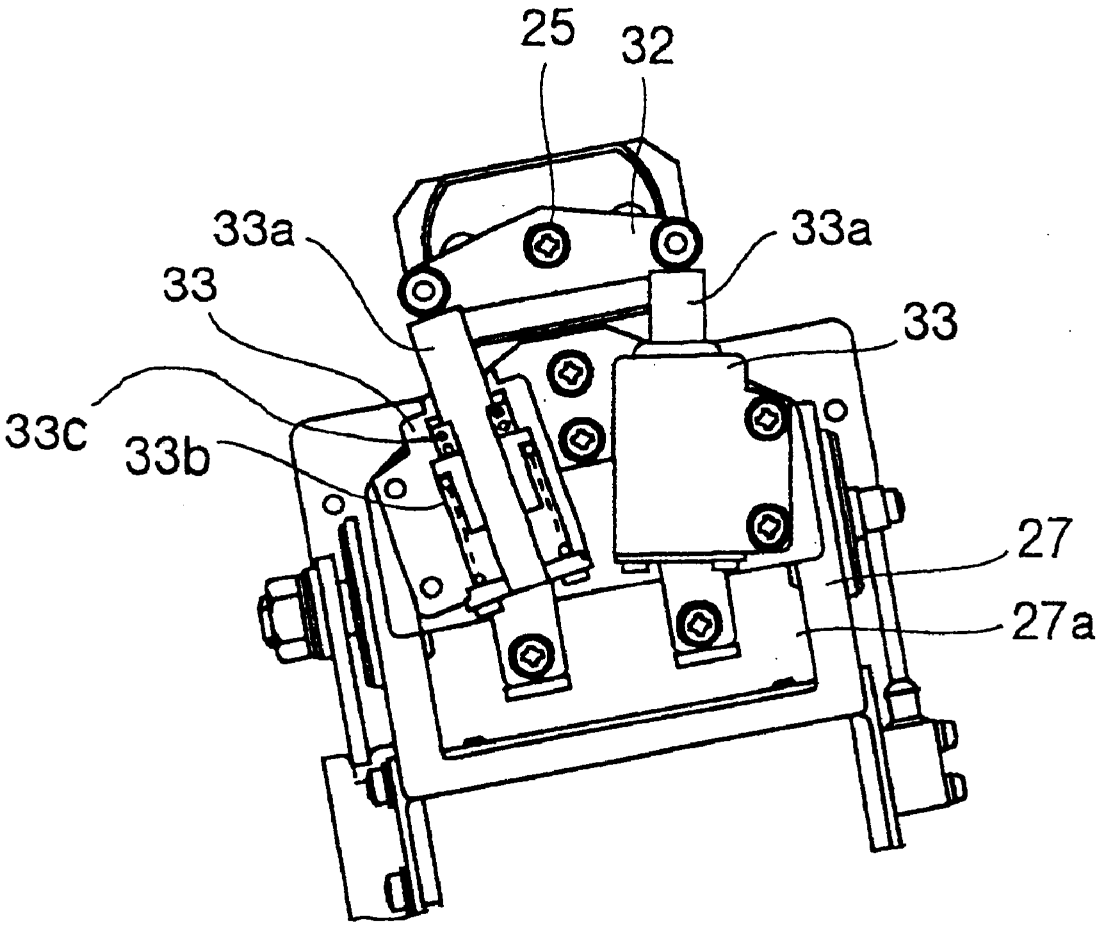
FIG. 9 is a view seen in the direction of the arrow 9 in FIG. 8.

FIG. 8 is a view seen from the outer side (the left side in this case) of the operator's seat in FIG. 6. FIG. 9 is a view seen from the direction of the axis Q of the first rotary shaft 25 in FIG. 8, and is an explanatory view of the essential part of the first bearing member 27. In FIGS. 8 and 9, the same elements as in the aforesaid drawings are given the same numerals and symbols, and the explanation thereof will be omitted. A rocking arm 32 shown in FIG. 9 is coupled and attached to the end surface of the first rotary shaft 25 at its center portion so that the arms on both sides are almost horizontal in the left and right direction. A pair of left and right spring boxes 33 and 33 are attached to the rear side surface of the first bearing member 27 via a mounting plate 27*a*. Each spring box 33 is internally provided with a pushing member 33*a* given a momentum upward by two kinds of springs 33*b* and 33*c* each having different momentum. The pair of left and right spring boxes 33 and 33 press the foremost end portions of the both arms of the rocking arm 32 upward by means of the respective pushing members 33*a* and 33*a*.

As a result, the pair of left and right spring boxes 33 and 33 can make a predetermined change in the operation force so that the operation positions, at which, for example, the application of the clutch begins to be effective and the application of the brake begins to effective, can be recognized, during the left and right turning operation of the monolever 20. Further, when the monolever 20 is returned to the neutral position, the neutral position is surely established by the momentum from both left and right directions, thus increasing operability.

Figure 10A:
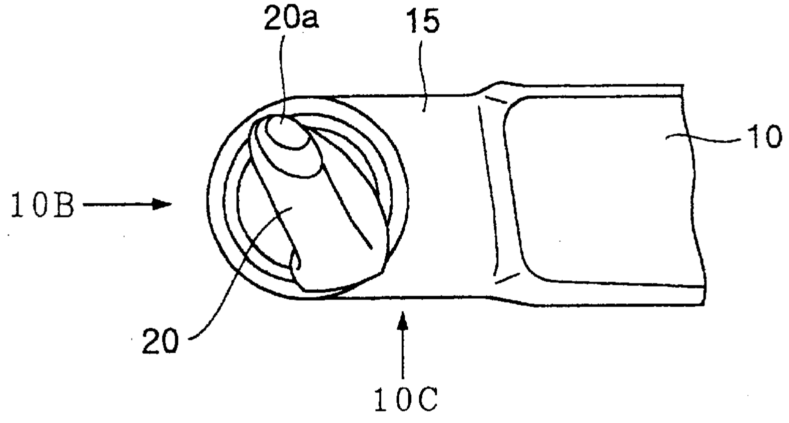
FIG. 10A, FIG. 10B, and FIG. 10C are external views of the monolever operation apparatus according to the first embodiment.
Figure 10B:
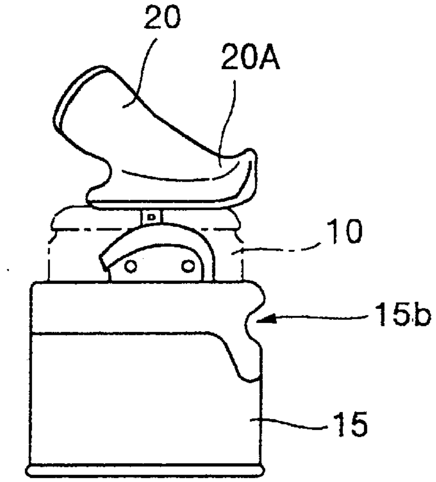
Figure 10C:
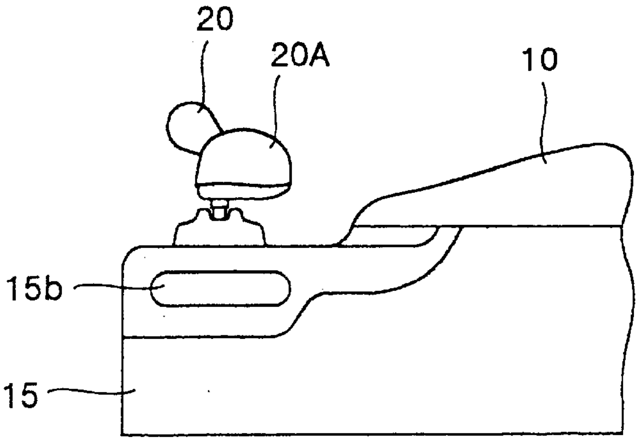

Next, the outer appearance of the monolever operation apparatus will be explained based on FIG. 10A, FIG. 10B and FIG. 10C. The armrest 10 is fixedly provided on the top of the console 15. In front of the arm rest 10, the palm rest 20A is integrally formed, and the monolever 20, which is provided with the speed gear shifting switch 20*a* for the operations of shifting up and shifting down the speed gears of the transmission, is placed. A recessed portion 15*b* is formed at the front portion of the console 15, on the outer side surface relative to the operator's seat, along the fore-and-aft direction. The length of the recessed portion 15*b* in the fore-and-aft direction is made to be almost equal to the length of the maximum stroke in the fore-and-aft direction from the forward position to the reverse position of the monolever 20 at the time of forward and reverse gearshift. As a result, on performing the operation of forward and reverse gearshift of the transmission, while gripping the monolever 20 with, for example, a thumb, an index finger and a middle finger, the foremost ends of the rest of the fingers (for example, a ring finger and a little finger) are rested in the recessed portion 15*b* throughout the range of the maximum stroke in the fore-and-aft direction for a forward and reverse gear shifting operation to thereby secure the hand. Consequently, the operator can always stabilize his or her body during the operation of the working vehicle, and can operate the monolever 20 with stability even if the working machine causes vibrations.

Figure 11:
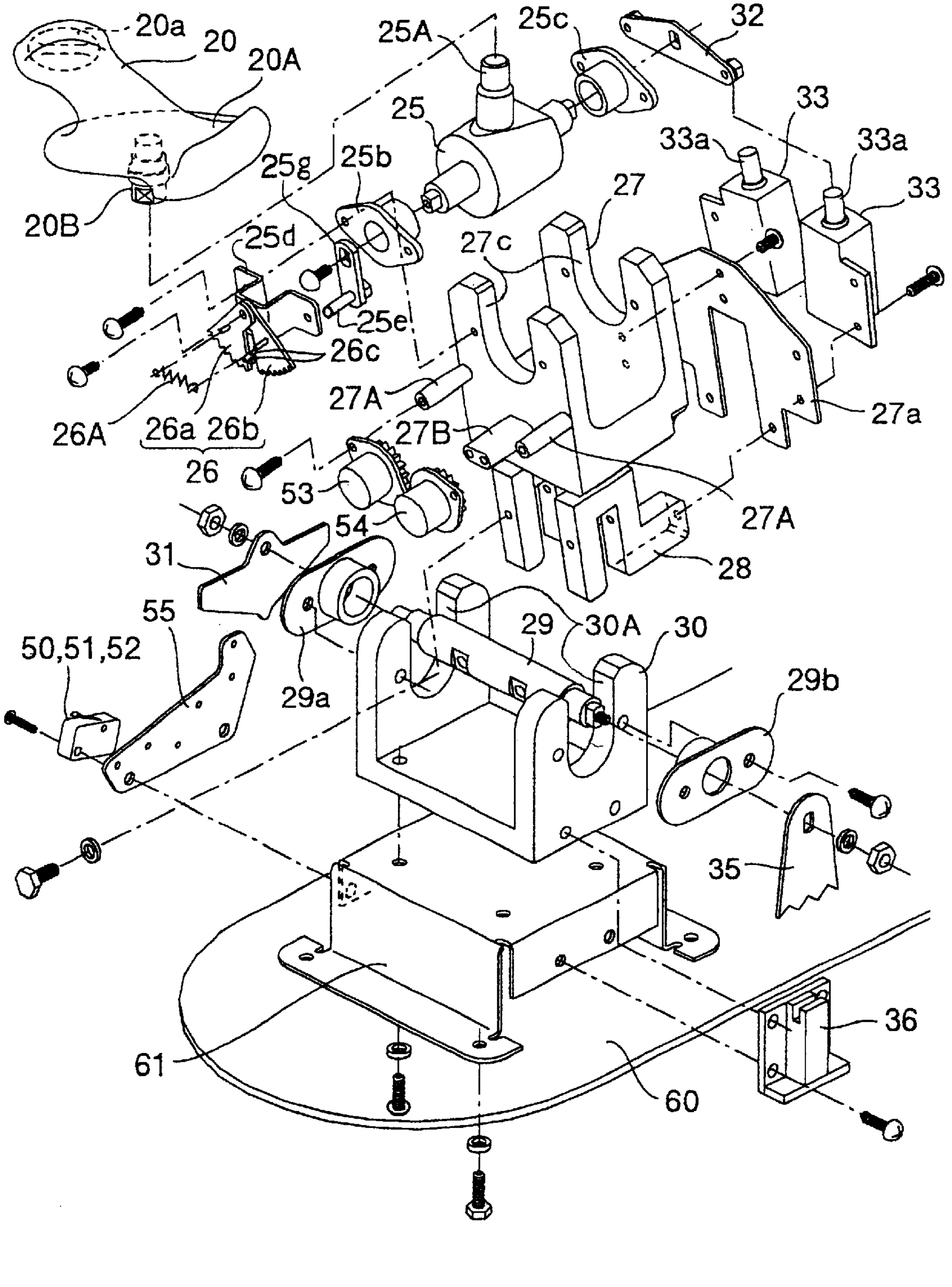
FIG. 11 is an exploded view of a link mechanism of the monolever operation apparatus according to the first embodiment.

Next, the link mechanism of the monolever operation apparatus according to the first embodiment of the present invention will be explained based on FIG. 11 with reference to FIG. 3.

The monolever 20 with the palm rest 20A for supporting a palm being integrally formed, having the speed gear shifting switch 20*a* for shifting the speed gears of the transmission, is provided. The monolever 20 is coupled to a projection 25A of the first rotary shaft 25 via the coupling member 20B. Both end portions of the first rotary shaft 25 are respectively supported by bearing flanges 25*b* and 25*c*. The rotary gear 26, consisting of a pair of left and right gears, that is, one rotary gear 26*a* and the other rotary gear 26*b*, is attached to a coupling member 25*d* attached to the bearing flange 25*b*. A pair of left and right stoppers 26*c* and 26*c* are fixed to the lower center portion of the coupling member 25*d*. A rotary member 25*g* having an arm 25*e*, which is provided to protrude forward at the position separated from the axis of rotation by a predetermined length in a radial direction, is attached to the front end surface of the first rotary shaft 25. The arm 25*e* is positioned at the inner side of the pair of left and right rotary gears 26*a* and 26*b*, and its foremost end portion is set to engage with the inner side end surface of both the gears 26*a* and 26*b*. As a result, following the rotation of the first rotary shaft 25, the arm 25*e* engages with the rotary gear 26*a* or the rotary gear 26*b* to rotate the same. Each of the pair of left and right rotary gears 26*a* and 26*b* is rotatable on one side of each of the pair of left and right stoppers 26*c* and 26*c*. When the rotary gear 26*a* rotates from the left side to the lower center part in FIG. 11, its inside end surface hits against the stopper 26*c*, whereby the rotary gear 26*a* stops, and does not rotate rightward any more. Likewise, when the rotary gear 26*b* rotates from the right side to the lower center part in FIG. 1, its inside end surface hits against the stopper 26*c*, whereby the rotary gear 26*b* stops, and does not rotate leftward any more. The tension spring 26A is attached to a portion between both the rotary gears 26*a* and 26*b*. When either the rotary gear 26*a* or 26*b* rotates in a direction to separate from each other, it is given a momentum to return to the original position by the tension spring 26A, and the both rotary gears 26*a* and 26*b* can be smoothly returned while they are abutted to the arm 25*e* on their return to the original position.

The other end portion of the first rotary shaft 25 protrudes from the rear of the bearing flange 25*c*, and the rocking arm 32 is attached to the rear end surface thereof. With the front and rear portions of the first rotary shaft 25 being rotatably fitted in the bearing flanges 25*b* and 25*c*, the shaft supporting portions of the bearing flanges 25*b* and 25*c* are placed on a pair of front and rear recessed portions 27C and 27C. The mounting portions of the bearing flanges 25*b* and 25*c* are respectively fastened to the front and rear surfaces of the first bearing member 27 with bolts or the like. Supports 27A, 27A and 27B provided with screw holes are fixed on one side surface in the fore-and-aft direction (the front side in this case) of the first bearing member 27. Two of the potentiometers 53 and 54 for detecting turning manipulated variables in the left and right direction are attached to the supports 27A, 27A, and 27B with use of fastening members such as bolts, with the aforesaid rotary gears 26*a* and 26*b* being engaged with the potentiometers 53 and 54 via the gears attached to the rotary shafts thereof. Consequently, when the monolever 20 is rotated in the left and right direction, the potentiometers 53 and 54 detect the angles of rotation of the rotary gears 26*a* and 26*b* respectively, and each detection signal is inputted into the controller 70 shown in FIG. 3. The coupling member 28 is attached to the bottom of the first bearing member 27. An upper portion of a mounting plate 27*a* is attached to the surface of the other side (the rear side in this case) of the first bearing member 27, and the lower portion of the mounting plate 27*a* is attached to the coupling member 28. The spring boxes 33 and 33 are attached to the mounting plate 27*a*. The spring boxes 33 and 33 are attached in such a manner that their pushing members 33*a* and 33*a* abut to both left and right end portions of the aforesaid rocking arm 32.

The first bearing member 27 is coupled to the second rotary shaft 29 via the coupling member 28. With bearing flanges 29*a* and 29*b* being fitted in the left and right end portions of the second rotary shaft 29, the bearing portions of the bearing flanges 29*a* and 29*b* are placed on left and right recessed portions 30A of the second bearing member 30, whereby the second rotary shaft 29 is supported by the second bearing member 30. The mounting portions of the bearing flanges 29*a* and 29*b* are attached to the left and right side surfaces of the second bearing member 30. The rocking arm 31 is attached to one end surface of the second rotary shaft 29 protruded from the bearing flange 29*a*, and the detent 35 is attached to the other end surface of the same shaft 29 protruded from the bearing flange 29*b*.

The second bearing member 30 is attached to the base 61, and the base 61 is attached to a bottom plate 60 of the console. The detection switches 50, 51 and 52 are attached to one side portion of the base 61 via a mounting plate 55, and the attaching position is set so that the rocking arm 31 abuts to the detection switches 50, 51 and 52 at a predetermined position when it rocks. Further, a detent receiving member 36 for engaging with the detent 35 and determining the forward, reverse and neutral operation positions is attached to the other side portion of the base 61.

Figure 12:
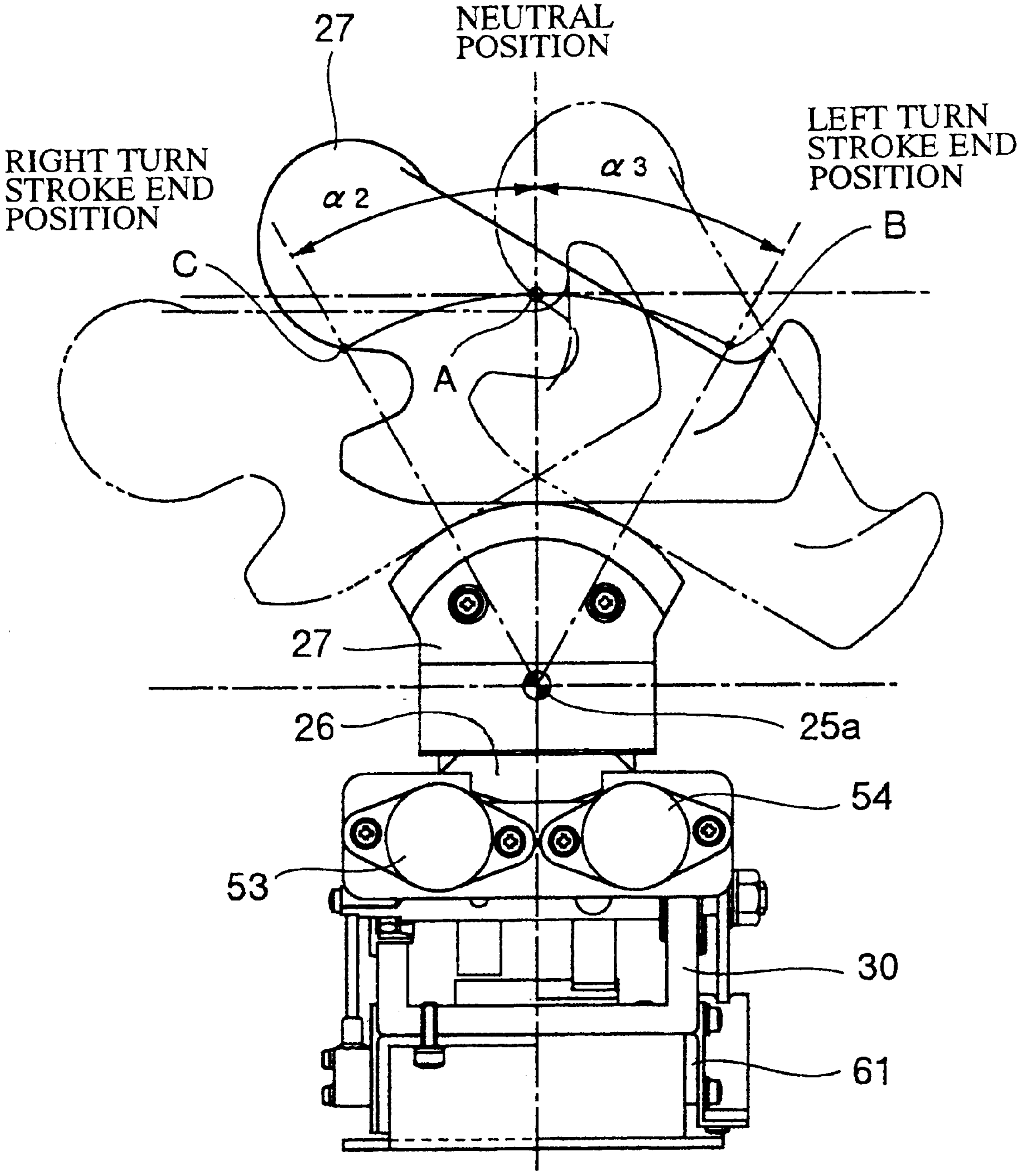
FIG. 12 is a side view of a monolever operation apparatus according to a second embodiment of the present invention.
Figure 13:
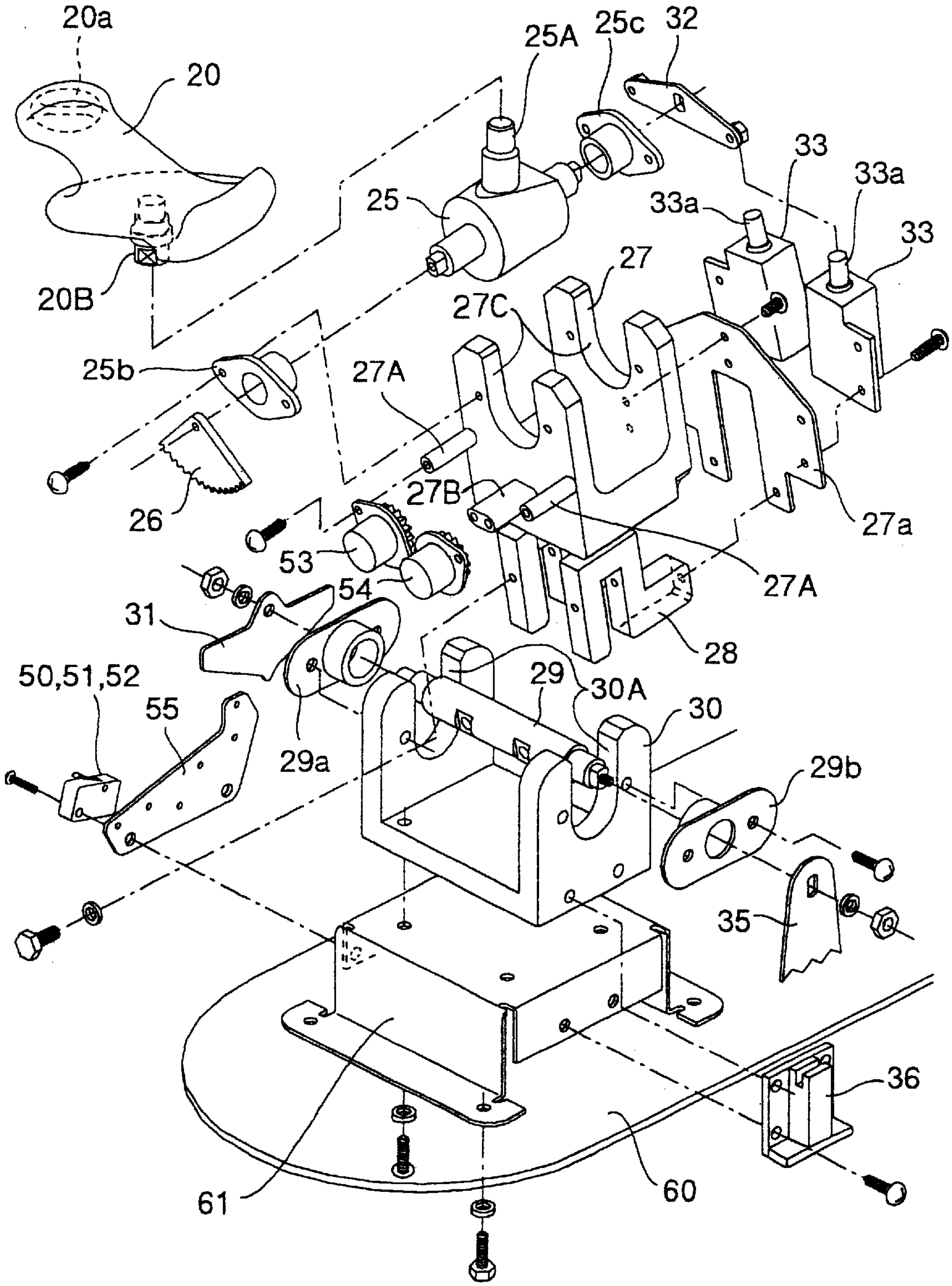
FIG. 13 is an exploded view of a link mechanism of the monolever operation apparatus according to the second embodiment.

Next, a second embodiment of the monolever operation apparatus according to the present invention will be explained based on FIG. 12 and FIG. 13. FIG. 12 is a side view of the monolever operation apparatus according to the second embodiment, and shows an example in which only one rotary gear 26 is used and the aforesaid tension spring 26A is omitted, compared with the configuration explained in the first embodiment. The configuration is the same as the first embodiment in the other part than the above. The configuration with only one rotary gear 26 will be explained with reference to an exploded view of a link mechanism shown in FIG. 13. It should be noted that only the elements different from the first embodiment will be explained below, and the other elements given the same numerals and symbols as those in the first embodiment are the same elements as in the first embodiment, and the explanation thereof will be omitted.

One end side (the front end side in this embodiment) of the first rotary shaft 25 is rotatably fitted into the bearing flange 25*b*, and the rotary gear 26 is attached to the end surface protruded from the same flange 25*b*. The rotary gear 26 is attached so as to be meshed with the two potentiometers 53 and 54 attached to one side surface (the front surface in this embodiment) of the first bearing member 27 for rotatably supporting the first rotary shaft 25 via the pair of bearing flanges 25*b* and 25*c*. The left and right angles of rotation of the first rotary shaft 25, that is, the left and right turning manipulated variables of the monolever 20 are respectively detected by the two potentiometers 53 and 54.

Incidentally, since the left and right turning manipulated variables of the monolever 20 are detected by only one rotary gear 26, the function of detecting the left and right turning manipulated variables can be basically satisfied by using only one potentiometer. In the second embodiment, however, two of the potentiometers 53 and 54 are provided because of the safety design enabling to detect the left and right turning manipulate variables based on a signal from the one potentiometer when the other potentiometer is out of order. By using only one rotary gear, the number of components is reduced, and the configuration is simplified as compared to the first embodiment.

Figure 14A:
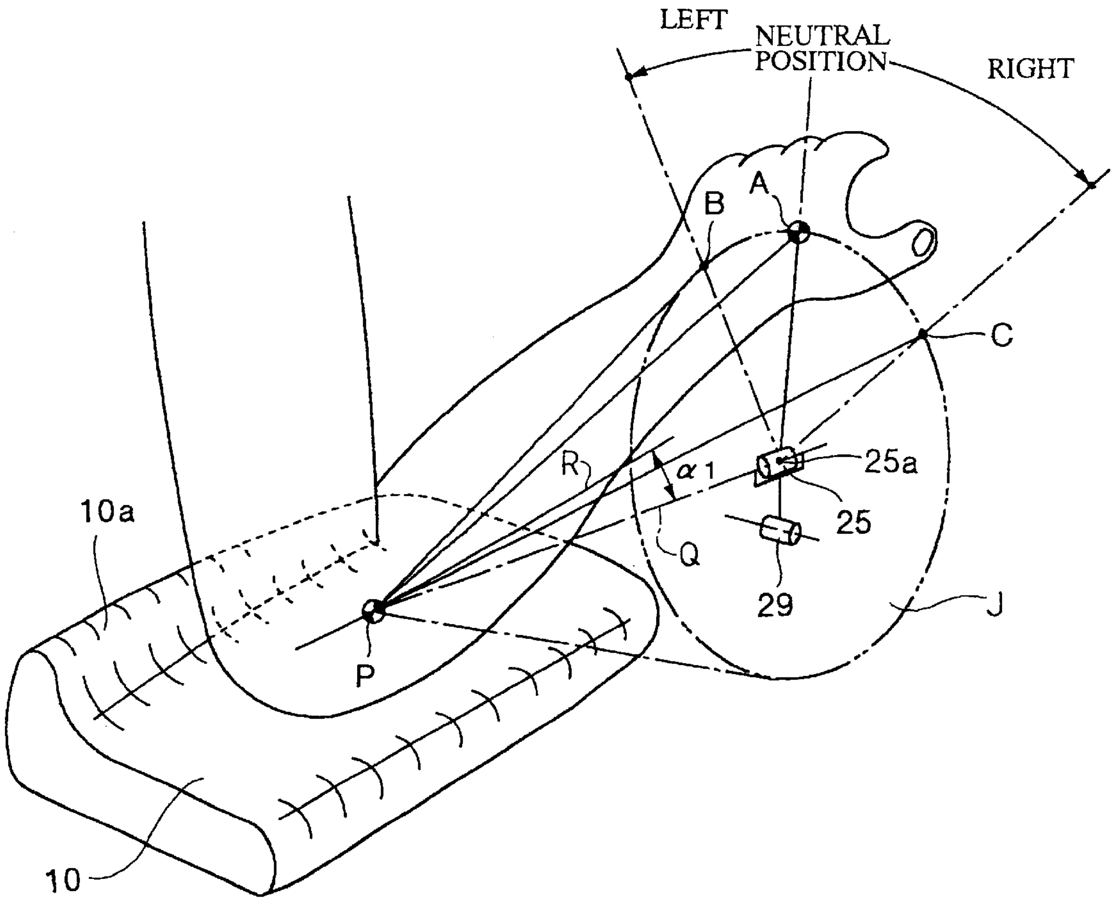
FIG. 14A and FIG. 14B are views explaining the operation of the monolever operation apparatus according to the present invention.
Figure 14B:
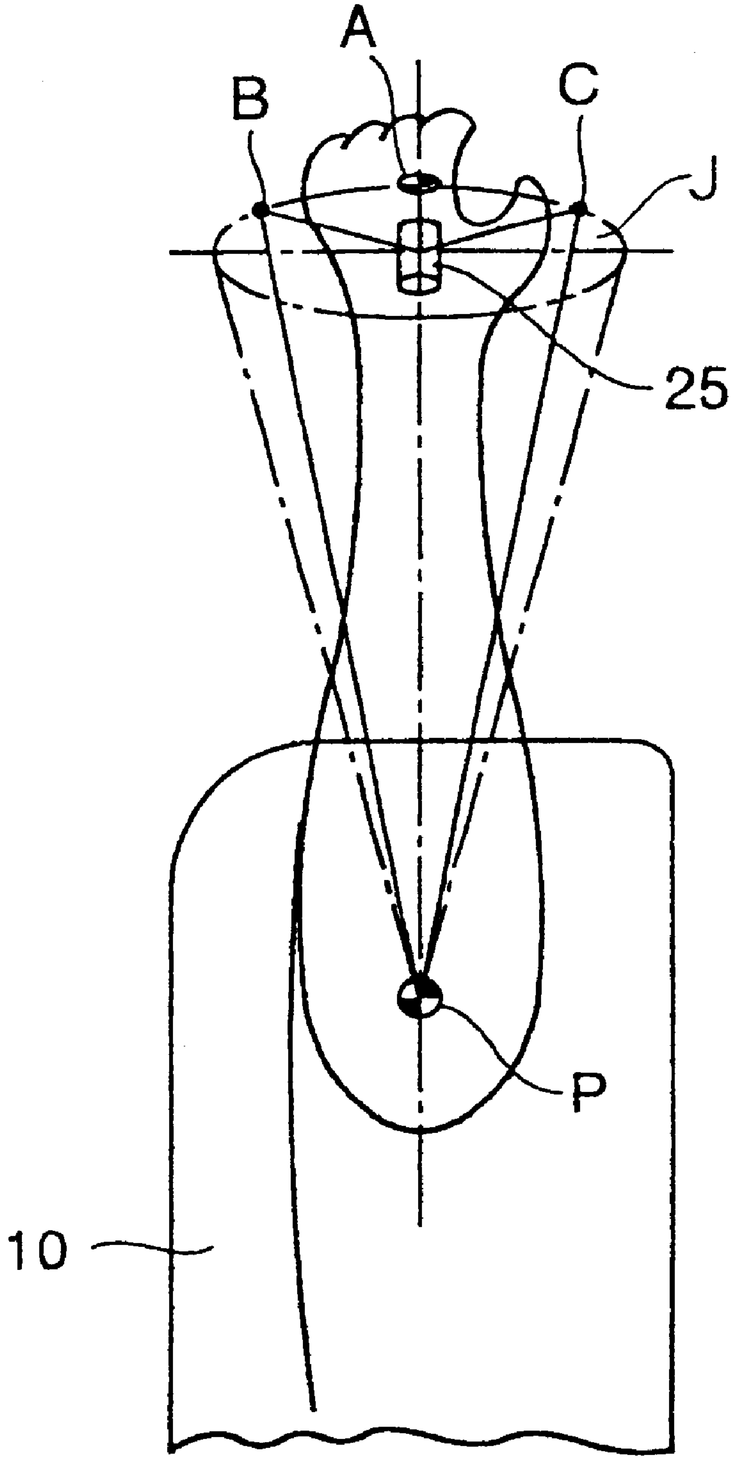

The essential part of the features of the first and second embodiments of the monolever operation apparatus according to the present invention will be explained based on FIG. 14A, FIG. 14B and FIG. 15 with reference to FIG. 4. FIG. 14A shows a three-dimensional view during the operation of the monolever, and FIG. 14B shows a plane view during the operation of the monolever.

As shown in FIG. 14A, when the operator grips the grip portion of the monolever 20 with his or her elbow being placed on the arm rest 10, the line connecting the fulcrum of rotation 25*a* of the first rotary axis 25 and the fulcrum of operation P below the elbow is designed to almost match the axis Q of the first rotary shaft 25 as explained in FIG. 4. Specifically, the angle, which is formed by the line connecting the fulcrum of rotation 25*a* of the first rotary shaft 25 and the fulcrum of operation P below the elbow, and the horizontal line R is set to be almost equal to the tilt angle $\alpha 1$ formed by the axis Q of the first rotary shaft 25 and the horizontal line R.

As a result, the locus of the line connecting the center of the grip (the center of the palm) and the fulcrum of operation P below the elbow during the left and right turning operation of the monolever 20 becomes a cone surface J with the fulcrum of operation P as its vertex, and the fulcrum of rotation 25*a* of the first rotary shaft 25 as the center of the bottom surface. This means that the distance from the center of the palm of the grip to the fulcrum of operation P below the elbow is constant during the left and right turning operation. Specifically, as shown in FIG. 14B, when the monolever 20 is operated from the neutral position A to the left turn stroke end position B, or the monolever 20 is operated from the neutral position to the right turn stroke end position C, there is no difference between the direct lengths of the line segments PA, PB and PC. Accordingly, even if the monolever 20 is operated in the left and right direction, it is not necessary to move the fulcrum of operation P below the elbow, thereby improving fine operability, and causing less fatigue even after long hours of operation, thus increasing operability.

Figure 15:
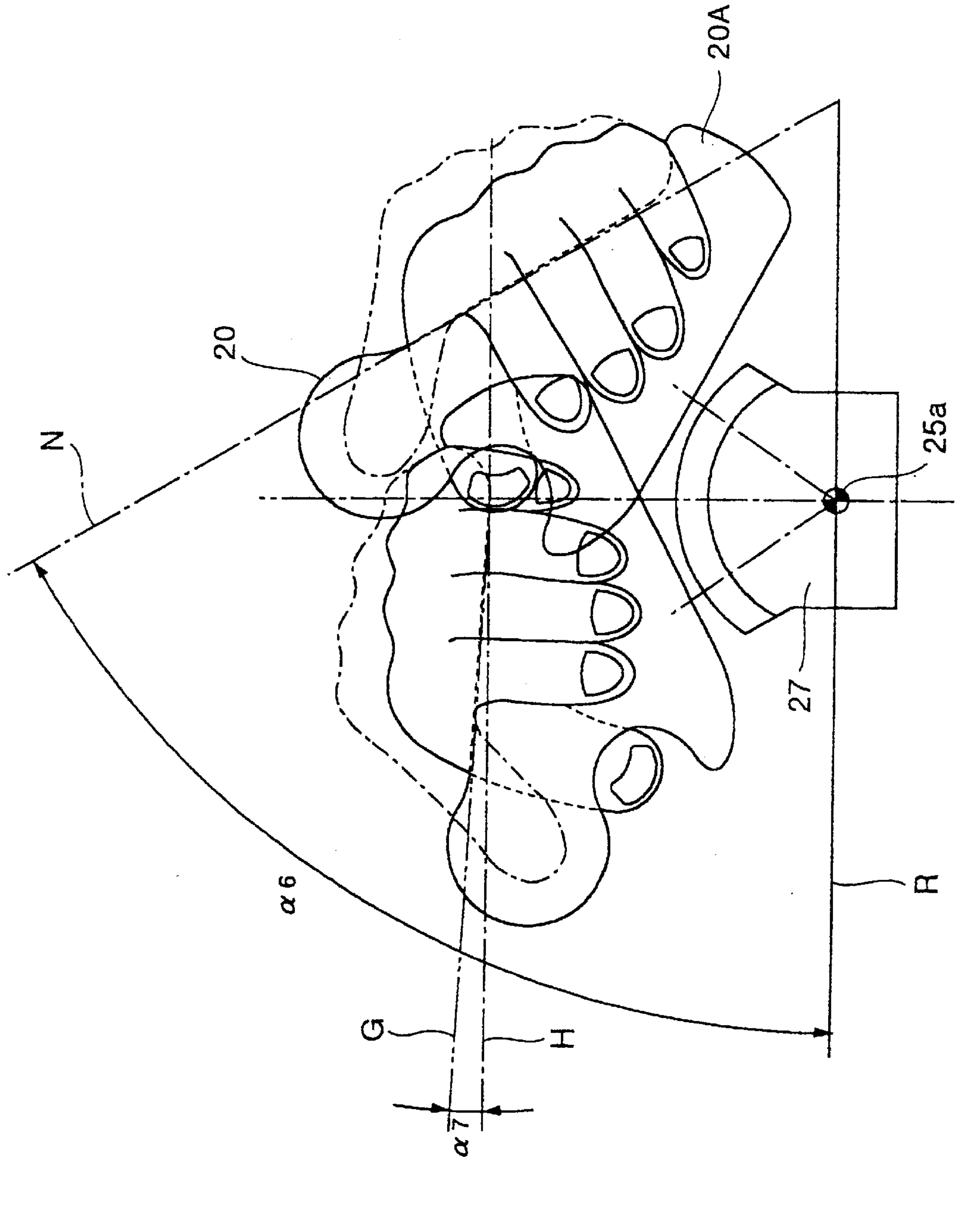
FIG. 15 is a view explaining the operation of a palm rest of the monolever operation apparatus according to the present invention.
Figure 16A:
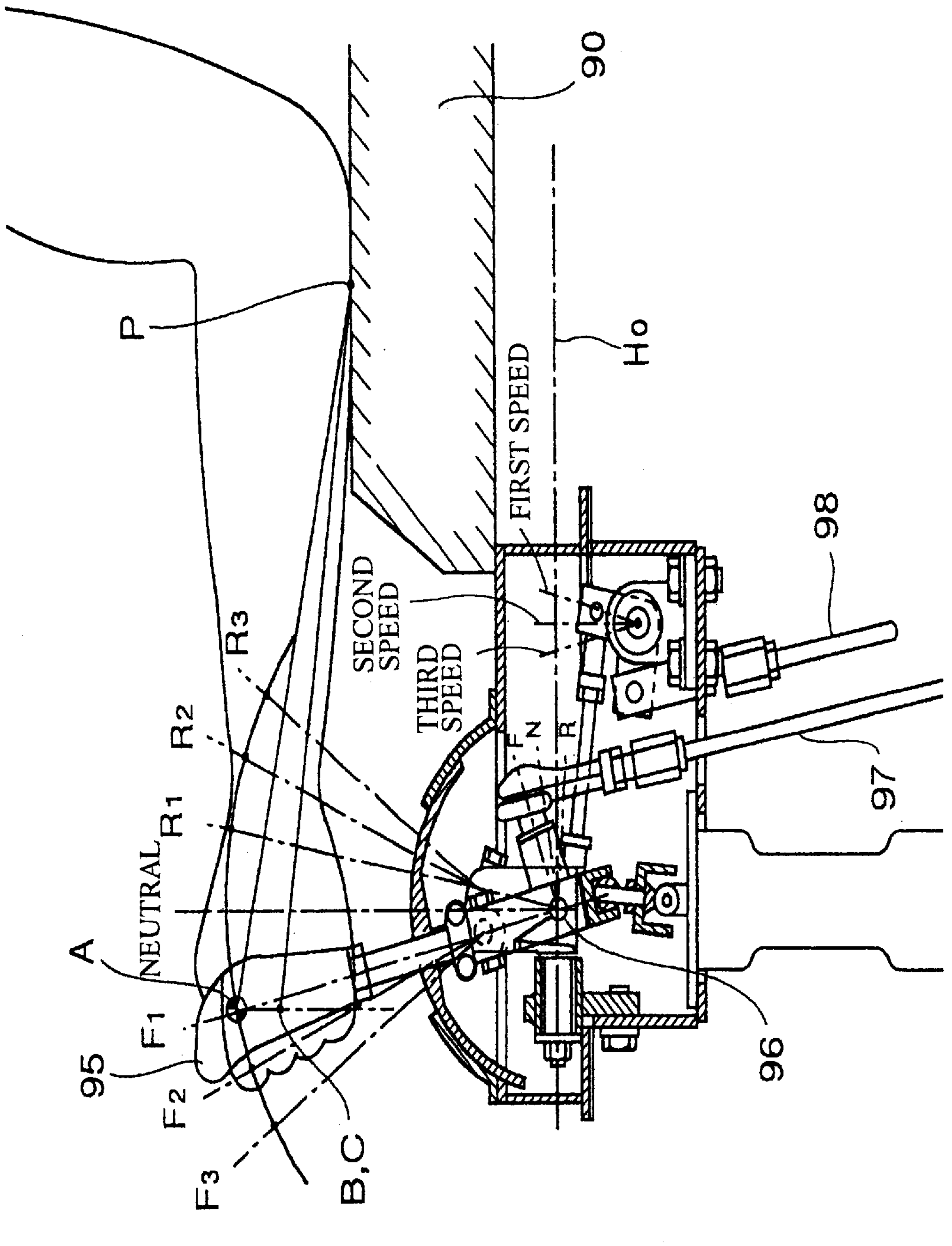
FIG. 16A PRIOR ART
FIG. 16A and FIG. 16B are explanatory views of a conventional monolever operation apparatus for a working vehicle.
Figure 16B:
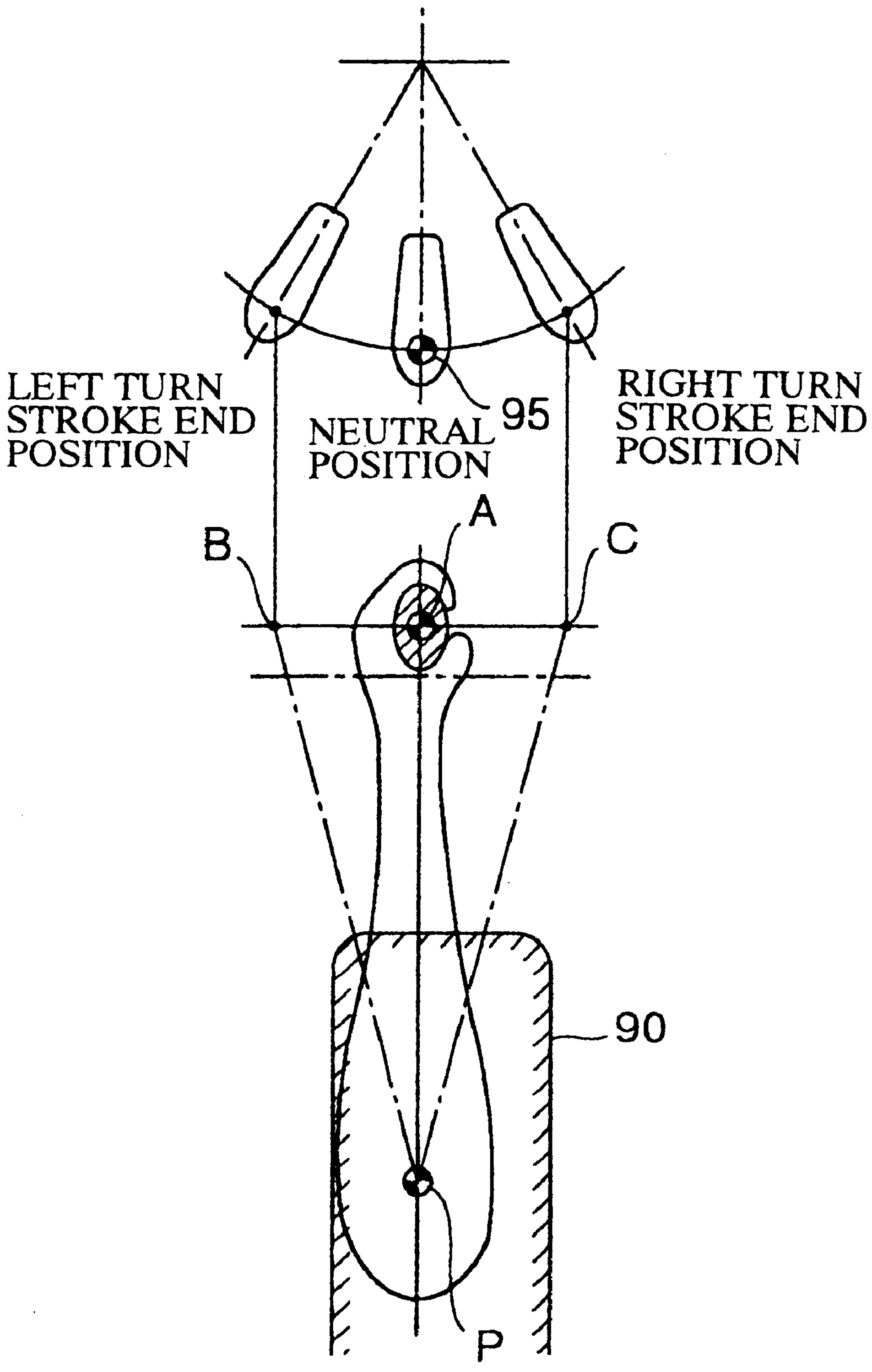
FIG. 16B PRIOR ART

FIG. 15 is a view explaining the operation when the monolever 20 is operated in the left and right direction with the palm being placed on the palm rest 20A of the monolever 20. An angle $\alpha 6$ made by the line N of the palm when operating the monolever 20 at the maximum stroke toward the outside (the right side in FIG. 15) of the operator's seat and the horizontal line R in the left and right direction, which passes through the fulcrum of rotation 25*a* of the first rotary shaft 25, is set at less than about 90 degrees, specifically, the palm at the outward maximum stroke is not allowed to face upward, whereby the angle is set so that the turning of the palm does not become large.

An angle $\alpha 7$ made by the line G of the palm when operating the monolever 20 at the maximum stroke toward the inner side of the operator's seat and the horizontal line R (compared with the horizontal line H equivalently in FIG. 15) is set at more than about 0 degrees. Specifically, the angle is set so that the turning of the palm to the inner side does not become large even if the monolever 20 is operated inward at the maximum stroke. Thereby, the excellent operability is provided during left and right operation.

As described above, according to the monolever operation apparatus of the working vehicle according to the present invention, even when the operator operates the monolever in the left and right direction with his or her elbow placed on the arm rest, the distance between the fulcrum of operation P below the elbow and the grip portion of the monolever is not changed, therefore making it unnecessary to displace the fulcrum of operation P below the elbow during the left and right operation. Consequently, the operation is always performed with the arm being stabilized, thus improving fine operability, causing less fatigue even after long hours of operation, and improving operability.

Further, the recessed portion is formed along the fore-and-aft direction on the outer side portion of the console, and therefore with at least a thumb, or a thumb and any of the other fingers (for example, an index finger and a middle finger or the like) being placed on the monolever, the foremost end portions of the rest of the fingers can be placed on the recessed portion to thereby fix the arm. As a result, the finger tips can be fixed, thereby facilitating to adjust the manipulated variable during fine operation, which improves fine operability, and making it possible to stabilize the operator's body even if the working vehicle causes vibrations, which improves operability.

Further, the aforesaid recessed portion of the console is formed throughout the range of the maximum stroke in the fore-and-aft direction relative to the traveling direction of the working vehicle, in which the monolever is operated for the forward or reverse gearshift of the transmission. As the result of the recessed portion being formed, throughout the range of the maximum stroke in the fore-and-aft direction in which the monolever is operated for the forward or reverse gearshift of the transmission, the operator can operate the monolever with his or her arm being fixed with use of the aforesaid recessed portion. Accordingly, the operator can always stabilize his or her body during operation of the working vehicle, thereby improving operability.

Further, since the side wall raised to the outer side portion of the top surface is formed on the arm rest, the operator can fix his or her elbow with the side wall. Thereby, the hand can be further stabilized against the vibrations of the vehicle, thus making it possible to securely operate the monolever.

Furthermore, in the monolever, the palm rest for supporting the palm of the operator in a downward direction with a slant of a predetermined angle is integrally formed, therefore making it possible to place the palm on the palm rest in a natural position. In addition, the recessed portion on which a thumb is placed is formed on the grip portion, therefore making it possible to operate the monolever with stability even if the working vehicle causes vibrations.

Further, the monolever is designed so that the palm does not face upward when the monolever is operated at the maximum stroke outward in the left and right direction, and the palm is upper than the horizontal surface when the monolever is operated at the maximum stroke inward in the left and right direction. Accordingly, the inside turn or the outside turn of the palm does not become large even if the monolever is operated to the maximum stroke end in the left and right direction, therefore making it possible to always operate the monolever in a stabilized state.

Furthermore, the arm rest is formed with a slant of a predetermined angle from the fulcrum of operation P below the operator's elbow to the front portion, the lower surface portion of the forearm does not touch the arm rest when performing rotating operation of the monolever in the left and right direction, and therefore the operation is not disturbed, thus facilitating to operate the monolever.

What is claimed is:

1. A monolever operation apparatus for a working vehicle including a stationary arm rest provided at a top surface of a console placed at least at any one of left and right sides of an operator's seat, and a monolever placed in front of and independent of said arm rest and rotatively operated in a fore-and-aft direction and a left and right direction respectively to perform switching of forward and reverse traveling and a steering operation, respectively, said arm rest and console having an outer side, and an inner side, opposite to and adjacent to the operator's seat respectively, in relation to a longitudinal centerline of said arm rest and console, a front side facing toward the front of the vehicle, and a top surface intermediate said inner side and outer side and facing upwardly, wherein an axis of the first rotary shaft for rotating said monolever in the left and right direction passes through the vicinity of a fulcrum of operation below an operator's elbow placed on said arm rest, wherein the top surface of said arm rest is inclined from the vicinity of the position, at which the operator's elbow is placed, toward the front, and said inclined top surface includes the axis of said first rotary shaft, and wherein when operated in the left and right direction, said monolever is allowed to be operated with a distance from said fulcrum of operation to a grip of said monolever being almost constant.

2. The monolever operation apparatus for the working vehicle in accordance with claim 1, wherein a side wall, which is raised upward and formed to extend at least from a position on which the elbow is placed toward the front, is provided on the outer side portion of the top surface of said arm rest.

3. The monolever operation apparatus for the working vehicle in accordance with claim 1, wherein an angle made by a line of an operator's palm and a horizontal plane when said monolever is operated to a maximum stroke outward in the left and right direction is not more than substantially 90 degrees, and wherein an angle made by a line of an operator's palm and a horizontal plane when said monolever is operated to a maximum stroke inward in the left and right direction is not less than substantially 0 degrees.

4. The monolever operation apparatus for the working vehicle in accordance with claim 1, further comprising:

a second rotary shaft which is placed at a position lower than said first rotary shaft and rotates said monolever in the fore-and-aft direction, wherein a maximum stroke of said monolever in the fore-and-aft direction is smaller than a maximum stroke thereof in the left and right direction.

5. The monolever operation apparatus for a working vehicle in accordance with claim 1, wherein when said monolever is operated in the left and right direction, a locus of the line connecting said fulcrum of operation below an operator's elbow placed on said arm rest and a grip of said monolever draws a form almost equal to a conical shape.

6. A monolever operation apparatus for a working vehicle including an arm rest provided at a console placed at least any one of left and right sides of an operator's seat, and a monolever placed in front of said arm rest and rotatively operated in a fore-and-aft direction and a left and right direction respectively, said arm rest and console having an outer side, and an inner side, opposite to and adjacent to the operator's seat respectively, in relation to a longitudinal centerline of said arm rest and console, a front side facing toward the front of the vehicle, and a top surface intermediate said inner side and outer side and facing upwardly, wherein when operated in the left and right direction, said monolever is allowed to be operated with a distance from a fulcrum of operation below an operator's elbow placed on said arm rest to a grip of said monolever being almost constant, wherein an axis of a first rotary shaft for rotating said monolever in the left and right direction passes through the vicinity of said fulcrum of operation, wherein said monolever has a palm rest for supporting an operator's palm formed integrally at a lower portion of said grip, and wherein in a neutral position, an upper end of said grip is inclined at a predetermined angle so that a side of said grip facing toward the inner side of the console is positioned in front of a side of said grip facing toward the outer side of the console, relative to the left and right direction, and is inclined toward said inner side of the console at about 30 degrees to about 45 degrees relative to a horizontal plane.

7. A monolever operation apparatus for a working vehicle including a stationary arm rest provided at a console placed at least at any one of left and right sides of an operator's seat, and a monolever placed in front of and independent of said arm rest and rotatively operated in a fore-and-aft direction and a left and right direction respectively, said arm rest and console having an outer side, and an inner side, opposite to and adjacent to the operator's seat respectively, in relation to a longitudinal centerline of said arm rest and console, a front side facing toward the front of the vehicle, and a top surface intermediate said inner side and outer side and facing upwardly, wherein when operated in the left and right direction, said monolever is allowed to be operated with a distance from a fulcrum of operation below an operator's elbow placed on said arm rest to a grip of said monolever being almost constant, and a recessed portion is formed along the fore-and-aft direction on the outer side portion of said console having an arrangement, in relation to said monolever, whereby at least the little finger of the operator can be inserted into the recessed portion when the thumb and at least the index finger of the operator is gripping the monolever.

8. A monolever operation apparatus for a working vehicle including an arm rest provided at a console placed at least any one of left and night sides of an operator's seat, and a monolever placed in front of said arm rest and rotatively operated in a fore-and-aft direction and a left and right direction respectively, said arm rest and console having an outer side, and an inner side, opposite to and adjacent to the operator's seat respectively, in relation to a longitudinal centerline of said arm rest and console, a front side facing toward the front of the vehicle, and a top surface intermediate said inner side and outer side and facing upwardly, wherein when operated in the left and right direction, said monolever is allowed to be operated with a distance from a fulcrum of operation (P) below an operator's elbow placed on said arm rest to a grip of said monolever being almost constant, wherein a recessed portion is formed along the fore-and-aft direction on the outer side portion of said console, and wherein said recessed portion is formed throughout the range of a maximum stroke during a forward and reverse gear shifting operation of said monolever.

9. A monolever operation apparatus for a working vehicle including an arm rest provided at a console placed at least any one of left and right sides of an operator's seat, and a monolever placed in front of said arm rest and rotatively operated in a fore-and-aft direction and a left and right direction respectively, said arm rest and console having an outer side, and an inner side, opposite to and adjacent to the operator's seat respectively, in relation to a longitudinal centerline of said arm rest and console, a front side facing toward the front of the vehicle, and a top surface intermediate said inner side and outer side and facing upwardly, wherein when operated in the left and right direction, said monolever is allowed to be operated with a distance from a fulcrum of operation below an operator's elbow placed on said arm rest to a grip of said monolever being almost constant, wherein an axis of a first rotary shaft for rotating said monolever in the left and right direction passes through the vicinity of said fulcrum of operation, wherein a side wall, which is raised upward and formed to extend at least from a position on which the elbow is placed toward the front, is provided on the outer side portion of the top surface of said arm rest, wherein said monolever has a palm rest for supporting an operator's palm formed integrally at a lower portion of said grip, and wherein in a neutral position an upper end of said grip is inclined at a predetermined angle so that a side of said grip facing toward the inner side of the console is positioned in front of a side of said grip facing toward the outer side of the console, relative to the left and right direction, and is inclined toward said inner side of the console at about 30 degrees to about 45 degrees relative to a horizontal plane.

* * * * *